United States Patent [19]
Vinciarelli et al.

[11] Patent Number: 5,786,992
[45] Date of Patent: Jul. 28, 1998

[54] EFFICIENT POWER CONVERSION

[75] Inventors: Patrizio Vinciarelli, Boston; Richard E. Beede, Andover, both of Mass.

[73] Assignee: VLT Corporation, San Antonio, Tex.

[21] Appl. No.: 681,618

[22] Filed: Jul. 29, 1996

Related U.S. Application Data

[63] Continuation of Ser. No. 224,834, Apr. 8, 1994, abandoned.

[51] Int. Cl.$^6$ .......................... H02M 5/42; H02M 7/537
[52] U.S. Cl. .............................. 363/89; 363/131
[58] Field of Search ........................ 363/20, 21, 34, 363/39, 65, 67, 69, 70, 89, 101, 123, 131; 323/223, 224, 225

[56] References Cited

U.S. PATENT DOCUMENTS

| | | | |
|---|---|---|---|
| 4,415,959 | 11/1983 | Vinciarelli | 363/21 |
| 4,558,601 | 12/1985 | Stasiek et al. | 73/862.23 |
| 4,645,997 | 2/1987 | Whited | 323/211 |
| 4,648,020 | 3/1987 | Vinciarelli | 363/71 |
| 4,672,298 | 6/1987 | Rohatyn | 323/208 |
| 4,677,366 | 6/1987 | Wilkinson et al. | 323/222 |
| 4,740,744 | 4/1988 | Lubarsky et al. | 324/78 |
| 4,940,929 | 7/1990 | Williams | 323/222 |
| 5,079,686 | 1/1992 | Vinciarelli | 363/15 |
| 5,235,504 | 8/1993 | Sood | 363/89 |
| 5,291,385 | 3/1994 | Vinciarelli | 363/20 |
| 5,359,278 | 10/1994 | Notohara et al. | 363/89 |

FOREIGN PATENT DOCUMENTS

| | | | |
|---|---|---|---|
| 1 171 906 | 7/1984 | Canada | 323/4 |
| 5064432 | 3/1993 | Japan . | |

OTHER PUBLICATIONS

Itoh, R. et al., Characteristics of Series–Connected PWM GTO Current–Source AC–DC Converter, *Fukuoka University Review of Technological Sciences*, Central Research Institute Publishers, 43:1–9, Nov. 1989.

Abdul–Karim, M.A.H. et al., Universal Digital Power Meter Design., *J. Elect. & Comp. Res.*, 3(1):33–43, Apr. 1989.
Test Case: Digital Power–Factor Controller Responds Faster to Load Changes, *Electronics Test*, pp. 28–29, Aug. 1984.
Al–Kayatt, H.A.H. et al., Digital Power Factor Electronic Processor Employing Sample–and–Hold on Maclarin Expansion, *Modelling, Simulation and Control*, A, AMSE Press, vol. 29, No. 1, pp. 55–63, Jul. 1990.

(List continued on next page.)

*Primary Examiner*—Matthew V. Nguyen
*Attorney, Agent, or Firm*—Fish & Richardson P.C.

[57] ABSTRACT

In a power conversion scheme, a power conversion apparatus consisting of boost conversion elements for effecting a boost conversion of power originating from a varying voltage source; additional conversion elements for also effecting conversion of power originating from the varying voltage source; and circuitry for selectively configuring the conversion elements with respect to delivery of power to a load to achieve greater conversion efficiency than if all of the power delivered to the load were constrained to flow through the additional conversion elements and at least some of the boost conversion elements. In another aspect power is converted from a voltage source having a predetermined source voltage range, and delivered to a load via two sets of power conversion elements, each set for effecting conversion of power from the voltage source, at least one of the sets having an input operating voltage range narrower than the source voltage range. The apparatus includes control circuitry for configuring and reconfiguring interconnections of the two sets with the voltage source and the load to provide an input operating voltage range for the apparatus which is greater than the input operating range of the set of power conversion elements having the narrower input operating voltage range. In another aspect, the input voltage operating range is enhanced for a power conversion circuit which has two sets of power conversion elements arranged to share power delivered to a load. The circuit is selectively configured with the two sets in series or not in series in a manner so that the input voltage operating range of the power conversion circuit is broader than the input voltage operating range of either of the sets of power conversion elements.

67 Claims, 18 Drawing Sheets

OTHER PUBLICATIONS

Slomovitz, D., Behaviour of power-factor meters under non-sinusoidal current and voltage, *Int. J. Elec.*, 70(4):827–838, 1991.

Purkayastha, I. et al., Effect of Harmonics on Power Measurement, *IEEE Trans. on Ind. Appln.*, 26(5):944–946, 1990.

Itoh, R. et al., Series connected PWM GTO current/source convertor with symmetrical phase angle control, *IEEE Proc.*, 137(B)(4):205–212, Jul. 1990.

Chen, M.T. et al., Power–component definitions and measurements for a harmonic–polluted power circuit, *IEEE Proc. C*, 138(4):299–306, Jul. 1991.

Ioannides, M.G. et al., Speed and Power Factor Controller for AC Adjustable Speed Drives, *IEEE Trans. on Energy Conversion*, 6(3):469–475, Sep. 1991.

Czarneki, L.S. et al., Powers in Nonsinusoidal Networks: Their Interpretation, Analysis, and Measurement, *IEEE Trans. on Instru. & Measurement*, 39(2):340–345, Apr. 1990.

Williams, S.M. et al., Implementation of Current Source Inverter for Power Line Conditioning, *IEEE Trans. on Indust. Appln.*, 27(4):773–779, Jul./Aug. 1991.

Taha, S.M.R. et al., A Novel Digital Power–Factor Meter Design, *IEEE Trans on Instru. & Measurement*, IM-35(4):638–632, Dec. 1986.

The chips are down for digital motor control, *Drive Systems*, pp. 31–32 (date unknown).

Womack, D.L., Power–factor metering gains new interest, *Electrical World*, pp. 33–34, Jan. 1980.

DePuy, R.P., Digital Control for Large Electrochemical Rectifier Systems, *IEEE Conference Record of IGA 1971 Sixth Annual Meeting of the IEEE Industry & General Applications Group*, pp. 799–806, Oct. 1971.

Guo, Y. et al., Concurrent Microprocessors–Based PWM Converter Control, *Conference Record of the 1990 IEEE Industry Applications Society Annual Meeting*, pp. 991–996, Oct. 1990.

Caldeira, P. et al., Utilization of the Series Resonant DC Link as a DC Motor Drive, *Conference Record of the 1990 IEEE Industry Applications Society Annual Meeting*, pp. 1208–1214, Oct. 1990.

Jasim, A.H. et al., A Digital Power–Factor Meter Design, *Modelling, Simulation & Control, A*, AMSE Press, 27(2):47–56, 1990.

Al-Ani, M.S.M. et al., A Fast Digital Power Factor Meter Design, *Modelling, Simulation & Control, A*, AMSE Press, 34(2):11–18, 1991.

Basheer, R.H. et al., Analog–Digital Dividing Circuit for Power–Factor Measurement, *Modelling, Simulation & Control, A*, AMSE Press, 34(4):31–36, 1991.

Abdul–Wahid, S. et al., Digital Power Factor Meter Design based on Quad–Slope ADC, *Modelling, Simulation & Control, A*, AMSE Press, 26(4):45–53, 1990.

Bapeswara Rao, V.V. et al., A new approach to the load compensation of a single–phase nonsinusoidal system, *J. Phys. E: Sci. Instrum.*, 17:852–853, 1984.

Elias, A., Novalight—An Energy Efficient Fluorescent Lighting System, *Electric Energy Conference*, pp. 116–119, Oct. 1989.

Takahara,. E. et al., Main Power System for Advanced AC Train, pp. 802–805 (date unknown).

Itoh, R. et al., Input and Output Characteristics of a Single–way Step–down Pulsewidth Modulated GTO Voltage Source Converter, pp. 21–28 (date unknown).

Lin, C.E. et al, Real–time optimal reactive power control of static VAR compensators, *Electric Power and Energy Systems*, 13(2):103–110, Apr. 1991.

Huckelheim, K. et al., Novel 4–Quadrant Converter Control Method, *EPE Aachen*, pp. 573–576, 1989.

Hino, H. et al., Digitally Controlled Resonant Converter for X–ray Generator Utilizing Parasitic Circuit Constants of High voltage–Transformer and Cables, *EPE Aachen*, pp. 361–365, 1989.

Kuwabara, K. et al., A Power Factor Improved AC–to–DC Converter, pp. 1–6 (date unknown).

Kinard, J.R. et al., Wattmeter Calibration at Zero Power Factor Using Digitally Generated Sinewaves, *IEEE Trans. on Instrum. & Measurement*, IM-25(4):547–549, Dec. 1976.

Martinez, P.M. et al., Medidor digital del factor de potencia, *Mundo Electronico*, 170:107–113, 1987, translation not proivided.

Abstract of Digital Single–Phase Power–factor Controller: Digital Circuit has Faster Response to Load Changes, *NTIS Note*, Jun. 1984.

Green, A.W. et al., (title unknown), *IEE Proc.*, 135(B)(6):362–370, Nov. 1988.

Crutu, G. et al., Detectarea Numerica A Fazei Dintr–un Sistem De Reglare Automata A Factorului De Putere, pp. 469–474 (date and place of publication unknown).

Janssen, R., Rechner zur schnellen Ermittiung von Oberschwingungen fur Stromrichterregler, *Regelungstechnische Praxis*, 23(7):245–250, Jul. 1981.

Itoh, R., Single–phase sinusoidal rectifier with step–up/down characteristics, *IIE Proceedings–B*, 138(6):338–344, Nov. 1991.

Jordan, Mark. "UC3907 Load Share IC Simplifies Parallel Power Supply Design", Unitrode Application Note. No. U–129, 1993–1994.

Vicor Product Catalog, 1991.

Vinciarelli et al., "Boost Switching Power Conversion", Serial No. 07/722,537, filed Mar. 8, 1991, patent application.

EFFICIENT POWER CONVERSION

This is a continuation of application Ser. No. 08/224,834, filed Apr. 8, 1994, now abandoned.

BACKGROUND

This invention relates to efficient power conversion.

Typical isolated, power factor corrected, power converters ("IPFC converters") accept power from an AC input voltage source and deliver power to a load at some predetermined value of DC load voltage. They are called "isolated" because they provide a high degree of galvanic isolation between the input voltage source and the load. They are called "power factor corrected" because they control the waveshape and phase of the current drawn by the converter from the AC input source to match the waveshape and phase of the voltage delivered by the AC input source. Unlike non-power factor corrected schemes (found, e.g., in converters which include "capacitive input" rectifiers), power factor correction enables the converter to draw less RMS current for a given value of converter input power. This is useful in allowing a device to withdraw the maximum possible amount of power from an AC branch circuit.

In one known way to implement an IPFC power converter 5 (FIG. 1), the bipolar voltage from the AC input source 18, Vac, is delivered to a full-wave rectifier 20. The unipolar, time varying, voltage at the rectifier output, Vin, is delivered to a non-isolated boost converter 10. The boost converter 10 belongs to a class of converters which deliver an output voltage which is greater than the value of the boost converter input voltage, and typically do so for input voltages down to essentially zero volts. PFC controller circuitry 14 delivers a control signal 50 to the boost converter 10 which performs two functions simultaneously. First, it keeps the output voltage, VB, of the boost converter at a predetermined voltage value, Vb, which is (a) above the peak value, Vp, of the rectified voltage Vin and (b) within the input voltage operating range of an isolated DC-DC converter 62. Second, it controls the input current of the boost converter, Iin, to conform to the phase and waveshape of the voltage Vin. The output voltage of the boost converter is filtered and smoothed by a storage capacitor 22 and delivered to the input of an isolated converter 62, which delivers power to the load 23 at a regulated value of output voltage Vo. In general, the isolated converter 62 would include both isolated power conversion circuitry (e.g., a transformer isolated PWM converter; or a transformer isolated zero-current switching converter) and a controller (not shown) for regulating the converter 62 output voltage.

Among the wide variety of known possible implementations of the boost converter and PFC control circuitry is the PWM (pulse-width modulated) boost switching power converter 2 of FIG. 2. If the switch 29 is opened and closed at a duty cycle D (where D=ton/(ton+toff)) then converter 2 will produce an output voltage equal to Vout=Vin/(1−D). Other examples of boost converters and PFC control circuitry are described in Vinciarelli, "Boost Switching Power Conversion," U.S. patent application Ser. No. 07/722,537; Wilkerson, et al., "Unity Power Factor Supply," U.S. Pat. No. 4,677,366; and Williams, "AC to DC Converter With Unity Power Factor," U.S. Pat. No. 4,940,929. A complete monolithic PFC controller integrated circuit 14 is sold as Part No. UC1854 by Unitrode Integrated Circuits, Merrimack, N.H., USA.

Among the known possible implementations of the isolated DC—DC converter 62 are various isolated "buck" topologies (e.g., flyback, PWM), zero-current switching "buck" converters (see, for example, Vinciarelli, "Forward Converter Switching at Zero Current," U.S. Pat. No. 4,415,959), and resonant converters. In general, a buck converter delivers a voltage to a load which is lower than the value of the converter equivalent input source voltage (which, in typical transformer isolated converters, is the value of the converter DC input voltage reflected into the load side of the transformer—e.g., the converter DC input voltage divided by the transformer turns ratio). An integrated circuit which includes the complete PFC controller 14 and most of the elements of a controller for a PWM DC-DC converter 62 is also available as Part No. UC1891, from Unitrode.

It is known to arrange multiple power converters to share predictably in delivering power to a load. Paralleling of PWM converters in power sharing arrays is described in Unitrode Application Note U-129, "UC3907 Load Share IC Simplifies Parallel Power Supply Design," in the "Unitrode Product & Applications Handbook 1993–94." Power sharing between quantized energy converters (e.g., zero-current switching converters) is described in Vinciarelli, "Power Booster Switching at Zero Current," U.S. Pat. No. 4,648,020 (incorporated by reference). Connecting power converter outputs in a fixed series arrangement is shown in Vicor 1991 Product Catalog, Rev. 1, published by Vicor Corporation, Andover, Mass. 01879, USA.

Power converters are frequently characterized by both a minimum and a maximum value of input operating voltage, Vmin and Vmax. The values of Vmin and Vmax cannot be set arbitrarily because a broader range, the ratio of Vmax to Vmin, comes at the cost of lower conversion efficiency (assuming other factors are equal—e.g., conversion topology, output voltage, converter layout, and size).

Some of the factors which cause this loss in efficiency are illustrated in FIG. 3, a partial schematic of an isolated buck converter. A MOSFET switch 11 connected in series with the primary winding of an isolation transformer 15 is turned on and off by a controller 12 to maintain the load 16 voltage at a constant value Vout. The pulsating voltage Vpri and current Isw are reflected into the secondary of the transformer and power is transferred forward to the load 16 via rectifier 18 and output filter 20. The output voltage, Vout, is essentially equal to the average value of the pulsating voltage, Vf, delivered to the input of the filter 20. For such a converter, maintaining the load voltage at a value Vout requires that the value of Vin be greater than a value Vmin=N*Vout. One factor which limits Vmax is the maximum voltage rating, Vb, of the switch 11. Thus, to increase the input operating range, either N, or Vb, or both, may be increased. For a MOSFET switch of a given die size, however, an increase in Vb results in an increase in switch on-resistance and this will result in increased switch losses. This will be further exacerbated if N is also increased as a means of decreasing Vmin, since, for a given amount of power throughput, lower values of Vin will result in higher average and rms values of Iin. Finally, the turns ratio N cannot be arbitrarily increased since this will increase both the peak and average values of Vf when Vin=Vmax (thereby requiring, for example, a higher voltage, and lossier, rectifier 18) and may also adversely affect the losses and parasitics (e.g., leakage inductance, interwinding and intrawinding capacitances) in the transformer itself.

One way to increase the input operating range of a power converter, while attempting to maintain a given level of efficiency and providing for a given level of power throughput at a given maximum environmental operating temperature, is to make the converter larger (e.g., use more, or larger, components). Thus, in FIG. 3, the increased resistance of a higher voltage switch 11 can be partially offset by using more switches in parallel or by using a larger die size switch.

Another way to increase the input operating range of a power converter and satisfy a given maximum operating temperature requirement is simply to accommodate the efficiency loss by reducing the maximum power rating of the converter at maximum operating temperature.

A way to reduce the minimum operating voltage, Vmin, of a power converter is to use two converters in a power sharing arrangement with their outputs connected in series. Since, in such an arrangement, each converter need only deliver Vout/2 volts to the load, the value of Vmin is effectively reduced by a factor of two. Connecting power converter outputs in a fixed series arrangement is shown in the Vicor 1991 Product Catalog, Rev. 1, published by Vicor Corporation, Andover, Mass. 01879, USA.

SUMMARY OF THE INVENTION

In general, in one aspect, the invention features boost conversion elements for effecting a boost conversion of power originating from a varying voltage source; additional conversion elements for also effecting conversion of power originating from the varying voltage source; and circuitry for selectively configuring the conversion elements with respect to delivery of power to a load to achieve greater conversion efficiency than if all of the power delivered to the load were constrained to flow through the additional conversion elements and at least some of the boost conversion elements.

Implementations of the invention may include the following features. The circuitry may selectively configure the conversion elements so that during some periods the power delivered to the load is constrained not to flow through the boost conversion elements. The power may be constrained not to flow through the boost conversion elements more than half of the time. The circuitry selectively may configure the conversion elements based on the voltage level of the varying voltage source, e.g., when the voltage level of the varying voltage source falls within a specific range of values. The circuitry may selectively configure the conversion elements based on when the voltage level of the varying voltage source passes a threshold, e.g., a threshold based on a minimum input operating voltage of the additional conversion elements.

The power converted by the boost conversion elements may be delivered to the additional conversion elements for conversion. All of the power converted by the boost conversion elements may be delivered to the additional conversion elements for conversion, e.g., delivered via a unidirectional element biased to permit current to pass only from the boost conversion elements toward the additional conversion elements. Or the power converted by the boost conversion elements may be delivered via a short circuit path directly to the additional conversion elements. During the periods when the power is constrained not to flow through the boost conversion elements, it may be delivered from the voltage source to the additional conversion elements via a unidirectional component. The voltage source may be connected to the boost conversion elements via a switch which in one state disconnects the voltage source from the boost conversion elements. The voltage source may be connected to the boost conversion elements via a short circuit path. The circuitry for selectively configuring the conversion elements may include a switch controller for controlling the switch.

The additional conversion elements may have a minimum input operating voltage and the boost conversion elements may deliver power to the additional conversion elements at a voltage which is greater than the minimum input operating voltage of the additional conversion elements.

The additional conversion elements may provide galvanic isolation between the source and the load. A power factor correcting controller may be used to cause variations in current drawn from the voltage source to follow variations in voltage of the voltage source. The power factor correcting controller may be associated with the additional conversion elements. The power factor correcting controller may regulate the voltage across the load to a predetermined value.

The voltage source may include an AC source and there may be a full wave rectifier for rectifying the AC source. The rectified power from the input power source may be delivered via a short circuit path directly to the input of the boost conversion elements.

The additional conversion elements may include a pair of converters operating in a power sharing arrangement. Reconfiguration control circuitry may connect the pair of converters either in series or in parallel. The power sharing arrangement may include power sharing control circuitry. The reconfiguration control circuitry may connect the pair of converters in series (or in parallel) when the voltage of the input source crosses a threshold. The threshold may be related to the maximum input operating voltage of either converter. The converters may share essentially equally in the power delivered to the load. The converters may include ZCS converters. One of the ZCS converters may include a booster and the other ZCS converter may include a driver.

Each of the converters of the pair may have a positive input and a negative input, and a switch may connect the positive inputs of the two converters, a switch may connect the negative inputs of the two converters, and a diode may connect the positive input of one of the converters to the negative input of the other converter. There may be output control circuitry for connecting the outputs of the pair of converters either in series or in parallel, e.g., connecting the outputs of the pair of converters in series (parallel) when the voltage at the input of the converters crosses a threshold. The threshold may be based upon the minimum input operating voltage of either converter.

There may be separate full wave rectifier circuits, the first rectifier circuit being interposed between the input source and the boost conversion elements, and the second rectifier circuit being interposed between the input source and the additional conversion elements. The output of the second rectifier circuit may be connected by a short circuit path to the input of the additional conversion elements. The rectifier circuits may include six unidirectional elements forming two bridges each having four of the unidirectional elements, two of the unidirectional elements belonging to both bridges, one of the bridges having its output connected to the boost conversion elements, the other having its output connected to the additional conversion elements.

In general, in another aspect, the invention features a method for converting power from a varying voltage source and delivering it to a load, by causing selectively (a) a boost conversion of power originating from the varying voltage source in boost conversion elements, and (b) another conversion of power originating from the varying voltage source in additional conversion elements; in a manner, with respect to delivery of power to the load, to achieve greater conversion efficiency than if all of the power delivered to the load were constrained to flow through the additional conversion elements and at least some of the boost conversion elements.

Implementations of the invention may include the following features. The conversions may be caused selectively to achieve a greater input voltage operating range for the apparatus than if all of the power delivered to the load were constrained to flow only through the additional conversion elements. The inputs (outputs) of the two converters may be connected in parallel or series.

In general, in another aspect the invention features apparatus for converting power from a voltage source having a predetermined source voltage range, and delivering it to a load via two sets of power conversion elements, each set for effecting conversion of power from the voltage source, at least one of the sets having an input operating voltage range narrower than the source voltage range. The apparatus includes control circuitry for configuring and reconfiguring interconnections of the two sets with the voltage source and the load to provide an input operating voltage range for the apparatus which is greater than the input operating range of the set of power conversion elements having the narrower input operating voltage range.

In general, in another aspect, the invention features a method for enhancing the input voltage operating range of a power conversion circuit which has two sets of power conversion elements arranged to share power delivered to a load. The method includes selectively configuring the circuit with the two sets in series or not in series in a manner so that the input voltage operating range of the power conversion circuit is broader than the input voltage operating range of either of the sets of power conversion elements.

Among the advantages of the invention are that it enables power conversion with greater efficiency while providing power correction and isolation.

Other advantages and features will become apparent from the following description and from the claims.

DESCRIPTION

Figure 1:
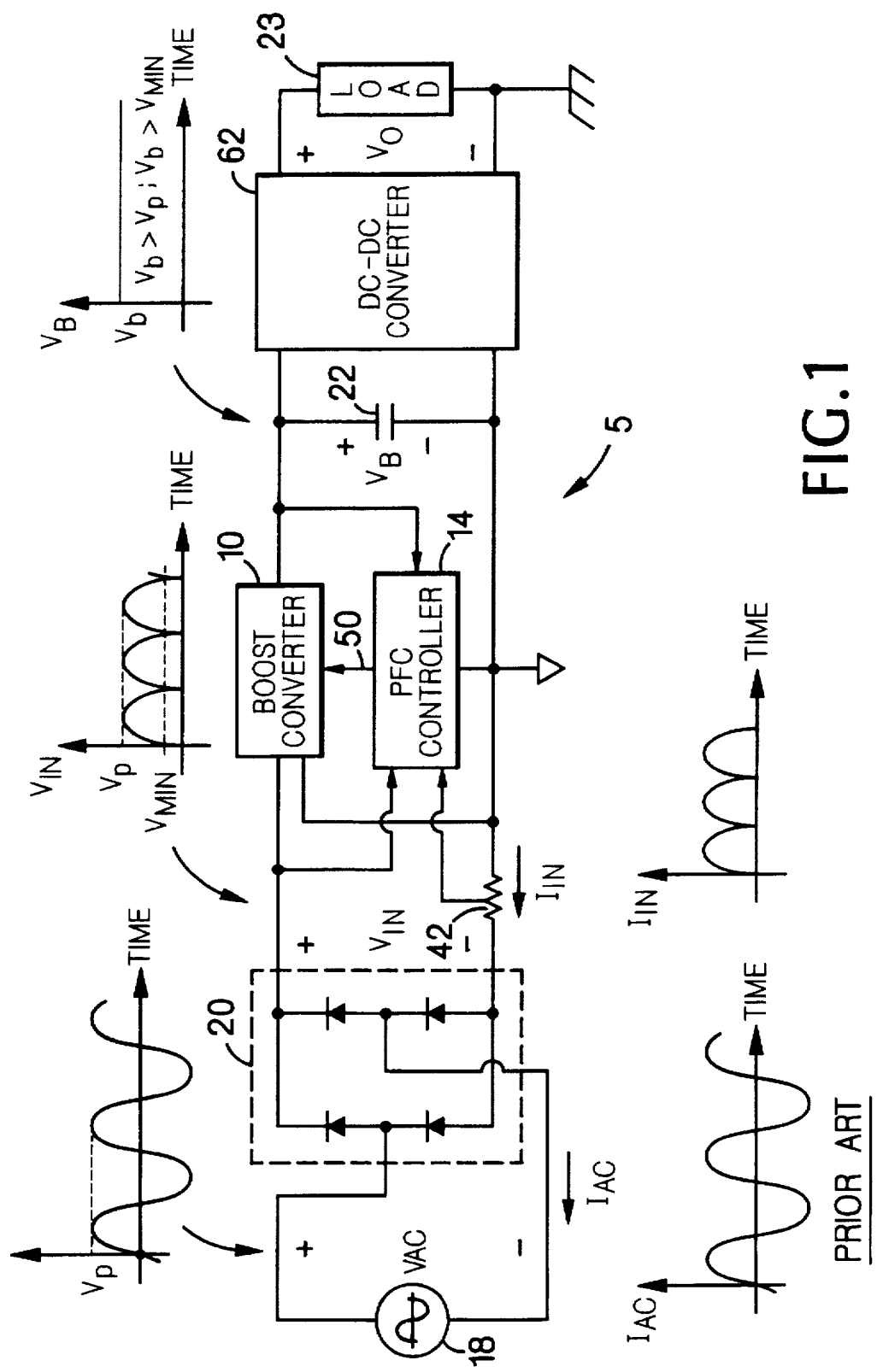
FIG. 1 is a circuit diagram of an IPFC power converter including a boost converter.

In the IPFC converter 5 of FIG. 1 the boost converter serves two essential functions throughout the entire AC source voltage cycle. First, it presents a power factor corrected load to the AC source. Second, it maintains the voltage VB at a level above both the minimum operating voltage, Vmin, of the DC-DC converter 62 and the peak value, Vp, of the AC source 18 over the specified AC input voltage operating range of the converter 5. Because all of the power drawn by the DC-DC converter 62 is delivered via the boost converter 10, i.e., a two-stage approach, the overall conversion efficiency of the converter 5 is the product of the conversion efficiencies of the two power conversion stages 10, 62. Thus, if the boost converter 10 and the isolated converter 62 have respective conversion efficiencies of 90% and 85%, then the overall conversion efficiency of the complete converter 10 will be 0.90×0.85=0.765, or 76.5%.

Figure 4:
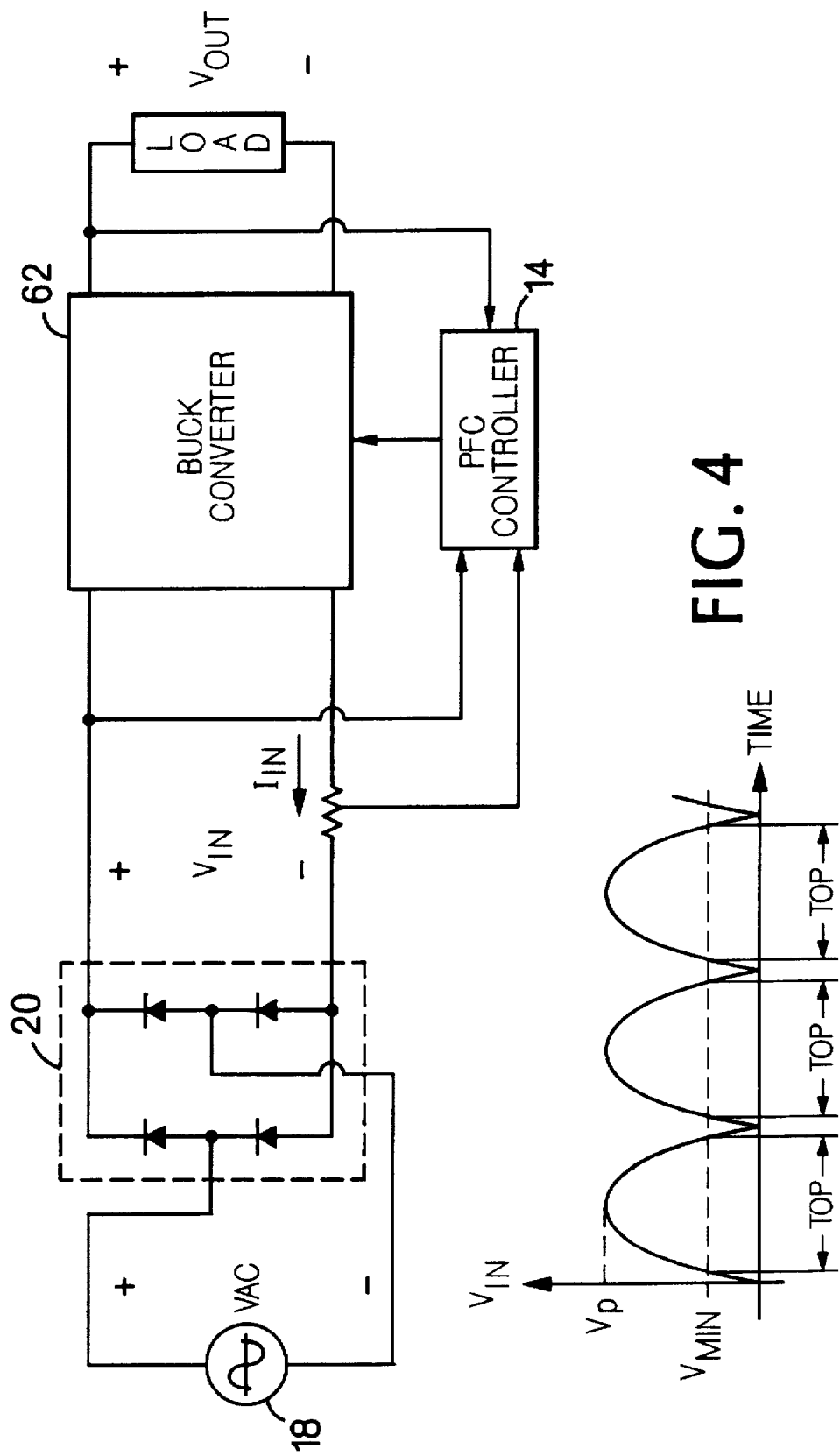
FIG. 4 is a circuit diagram of an isolated converter with a power factor correcting controller.

The features provided by the boost converter in FIG. 1 are needed only during the portion of the AC operating cycle when the voltage Vin is below the minimum operating voltage, Vmin, of the isolated converter 62. If the boost converter were eliminated and the PFC controlled the isolated converter 62 operating by itself (as shown in FIG. 4), then the isolated converter 62 could perform both output voltage regulation and power factor correction throughout those portions of the cycle that Vin is above the minimum input operating voltage, Vmin. These time periods are labeled Top in the waveform in FIG. 4. But during the remainder of the cycle, when Vin is below Vmin, the isolated converter would no longer be able to reliably regulate the voltage Vout or to control the phase and waveshape of the current Iin. This would cause distortions in the output voltage, Vout, and the input current, Iin, and result in degraded power factor correction performance. The degree of performance degradation would even vary with changes in the value of the AC line voltage (e.g., the voltage Vp) because those changes would affect the relative amounts of time that the converter 62 was operational and non-operational during an AC line cycle.

The inclusion of boost converter 10 overcomes these problems by maintaining the converter input voltage above Vmin. But operating the boost converter throughout the entire AC line cycle has a significant drawback: because both the input voltage and current are sinusoidal and in phase, the majority of power is drawn from the line at or near the peak of the AC line cycle, and it is under these operating conditions that the boost converter will exhibit the greatest portion of its overall power loss. Yet, the benefit of the boost converter is needed only when the line voltage is low, e.g., below Vmin, not when the line is near its peak value. Thus, the boost converter produces its greatest negative impact on overall converter efficiency during the time period when it is not actually needed-during the time period when the AC source voltage is above Vmin.

Figure 5:
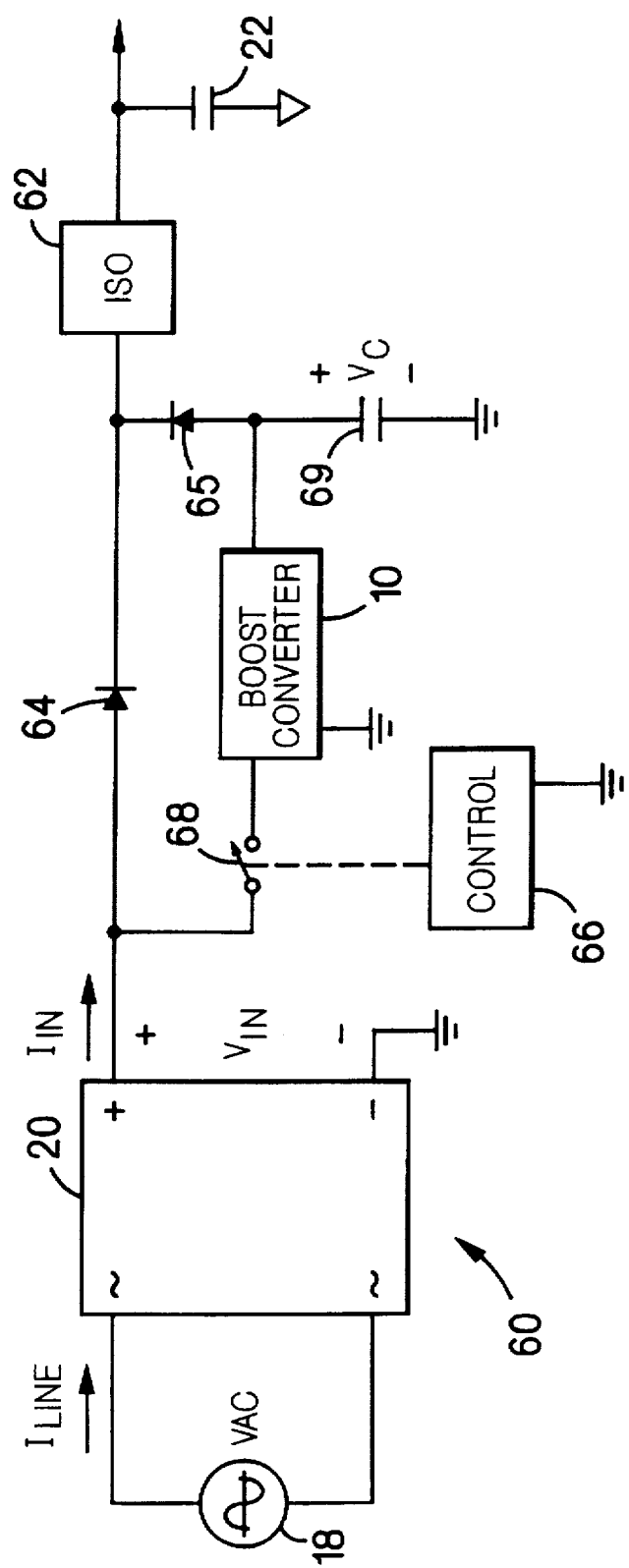
FIG. 5 is a circuit diagram of a quasi-single stage IPFC converter.

As shown in FIG. 5, in a quasi-single stage, IPFC converter circuit 60 a boost converter 10 delivers power to an isolated converter 62 for only a portion of an AC line cycle. The isolated converter 62 may be any isolated converter having a minimum operating voltage Vmin and the boost converter 10 may be any non-isolated boost converter. Isolated converter 62 includes a power factor correction controller (not shown, but which may be any of the controllers previously mentioned) which controls the current Iin to follow the waveshape of Vin and which also controls the output voltage of the converter 62 to be regulated at a predetermined value Vout. The boost converter is arranged to maintain its output voltage, Vc, at a predetermined value which is at, or slightly above, the minimum input operating voltage of the isolated converter 62. Full wave rectifier 20 converts the bipolar AC source voltage Vac 18 into a unipolar voltage Vin. Switch control circuitry 66 closes switch 68 whenever the rectified line voltage, Vin, is below an activation threshold value which is also set to be above the minimum operating voltage of the isolated converter 62. When the switch 68 is closed, the boost converter is activated and supplies current to the isolated converter input, via diode 65, thereby maintaining the input voltage to the isolated converter 62 above its minimum operating voltage Vmin. During the time that the boost converter 10 is supplying power to the isolated converter 62, the power factor correction controller in the isolated converter continues to force the current Iin to follow the waveform of the voltage Vin (and therefore forces the bipolar AC line current Iline to follow the waveform of the AC source voltage Vac). Capacitor 69 accepts the time varying current delivered by the boost converter and minimizes time variations in the voltage Vc. Since Vin is less that Vc during this period, diode 64 is reverse biased and the overall converter 60 operates in a "two-stage" mode with all of the power drawn by the isolated converter 62 being supplied by the boost converter 10.

When the voltage Vin rises above the activation threshold the switch is opened by control circuitry 66 and the boost converter ceases operating. Power is delivered directly from the full-wave rectifier 20 to the isolated converter via diode 64. Since the value of Vc is below Vin during this time, diode 65 is reverse biased. During the time that the switch 68 is open the power factor correction controller in the isolated converter causes the converter 62 to appear as a power factor corrected load to the AC source 18 and also controls the converter 62 to regulate the output voltage of the converter 62 at a value Vout. Output capacitor 22 stores energy as the input AC line voltage, and consequently both the input current and power output of the isolated converter fluctuate in time under the control of the power factor correction controller included in the converter 62. The capacitor charges during times of high power output from the converter 62 (e.g., when the voltage Vin, and current Iin, are relatively high) and discharges when the power output from the converter is low (e.g., when Vin and Iin are relatively low).

The power conversion topology shown in FIG. 5 is "quasi-single stage", since the switch is closed for "two-stage" operation for only a small fraction of each energy cycle. At all other times during the energy cycle, energy is processed only by the isolated converter 62. This can substantially improve the overall conversion efficiency as compared to the converter 5 of FIG. 4.

For example, assume the following. Both the minimum operating voltage of the isolated converter 62, Vmin, and the switch 68 activation threshold are 50 Volts. The AC line voltage is 85 VAC (for which Vp=120 V). The efficiency of the boost converter is 90% and the efficiency of the isolated converter is 85%. And the converter 60 is delivering power to a load and drawing 500 Watts from a sinusoidal AC source 18.

Figure 6:
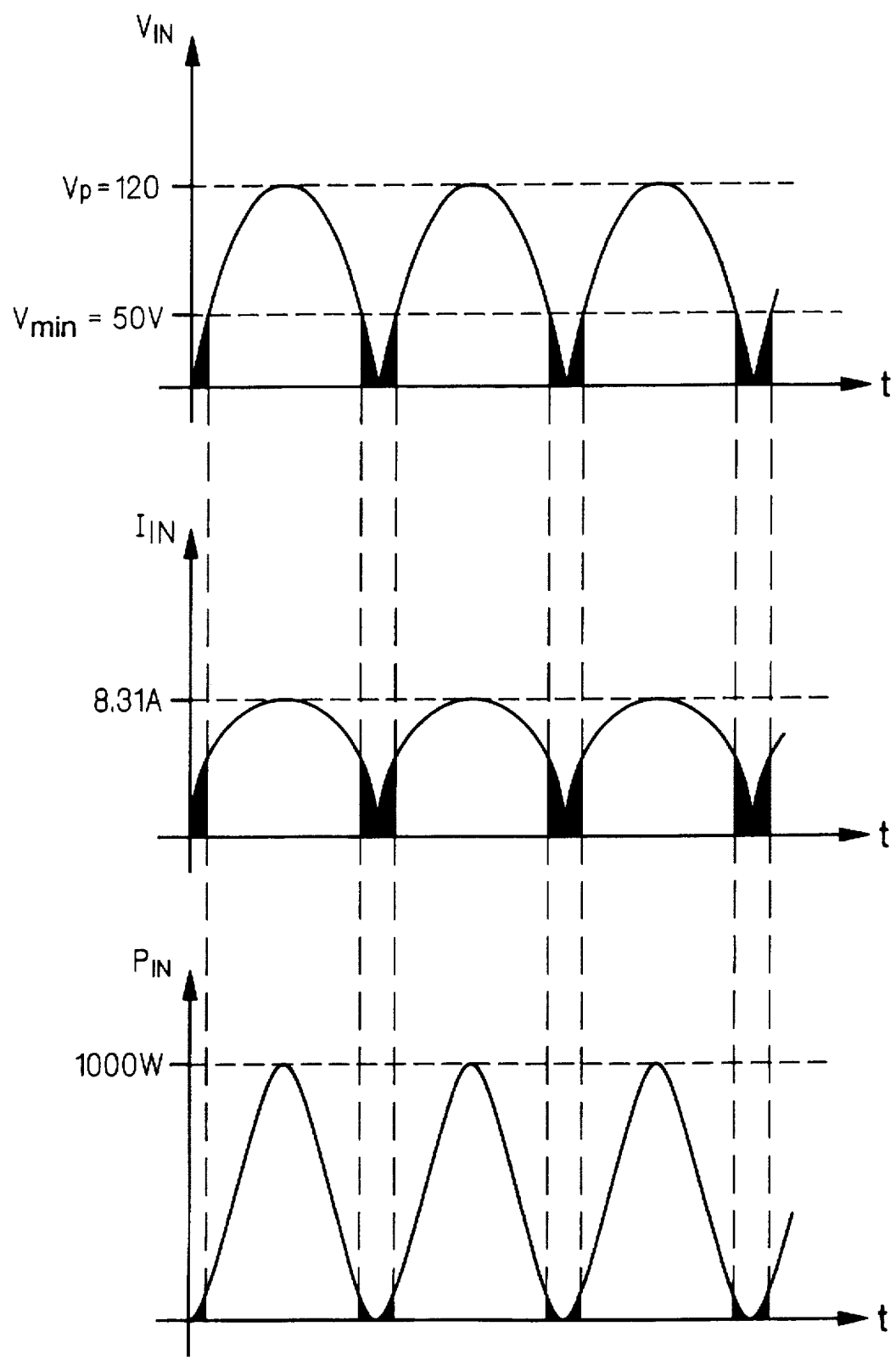
FIG. 6 shows waveforms for input voltage, input current and input power for the converter of FIG. 5.

Under those assumptions, both the input voltage, Vin, and the input current, Iin, (FIG. 6) will be unipolar sinusoids (due to the action of the rectifier and the power factor correcting controller in the isolated converters 62) and the peak value of Iin will be 8.31 Amperes. The input power, which is the product of Vin and Iin, will peak at 1000 Watts. During the shaded portions of the waveforms, when the voltage Vin is below Vmin, the power is processed by both converters 10, 62. In the example, the power processed during this time is only 3.2% of the total power, or 16.1 Watts. The remainder of the power, 483.9 Watts, is processed during the balance of the AC line cycle and this power processing is done solely by the isolated converter 62. As a result, the power loss during the shaded portion of the cycle, when both converters are processing power, is 16.1*(1−0.90×0.85)=3.78 Watts, and the power loss during the balance of the cycle, when only the isolated converter 62 is processing power, is (1−0.85)×494.4=74.16 Watts, resulting in a total loss of 77.94 Watts. Since the power delivered to the load is 500−3.78−77.94=418.28 Watts, the overall efficiency of the converter 60 is 418.28/500 0.837, or 83.7%. This is not much worse than the efficiency of the isolated converter 62 alone and is significantly better than the 76.5% efficiency exhibited by the converter 10 of FIG. 1 in which both converters 10, 62 continuously process power throughout the entire AC line cycle.

Figure 2:
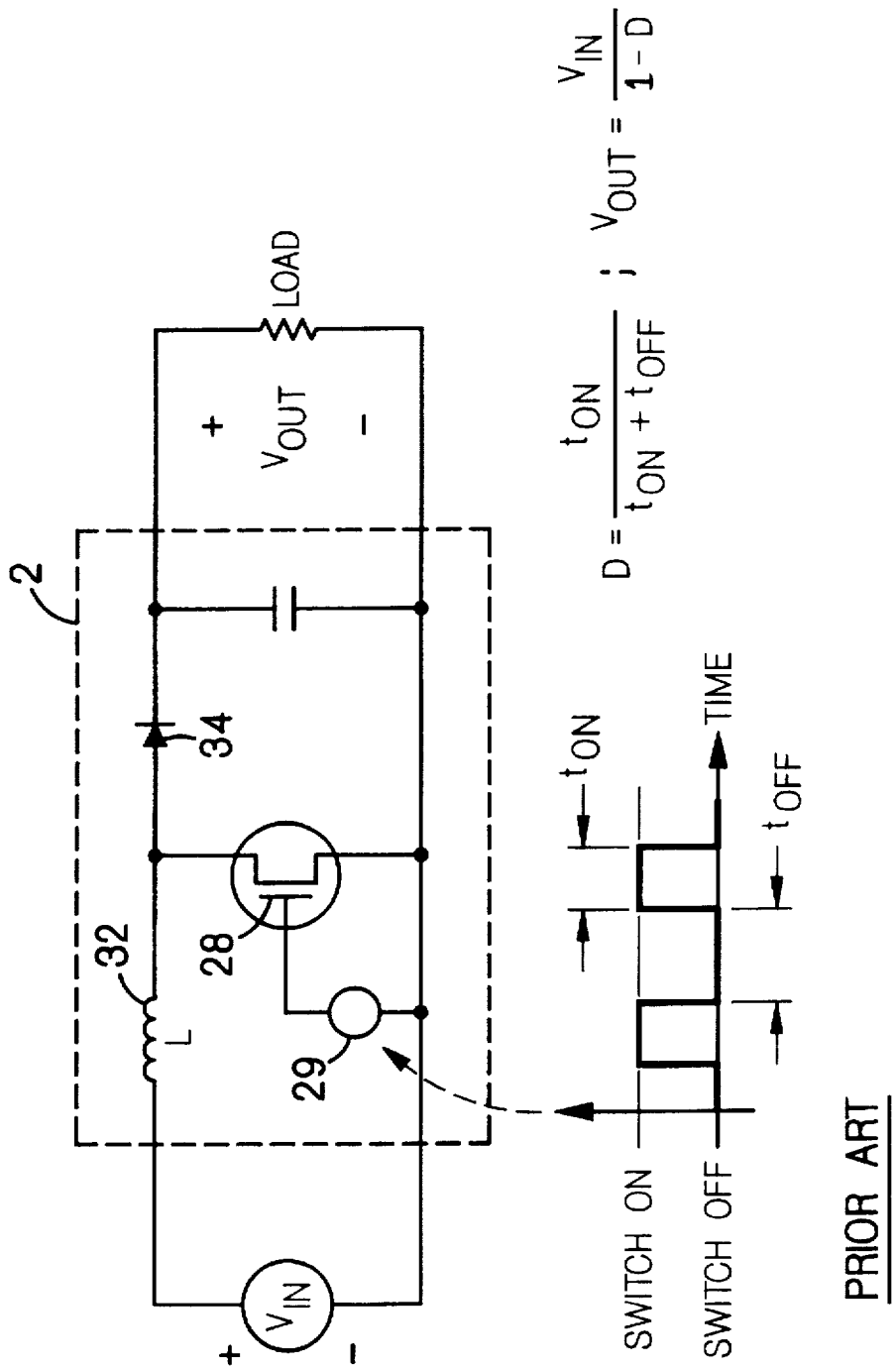
FIG. 2 is a circuit diagram of a non-isolated boost converter.
Figure 3:
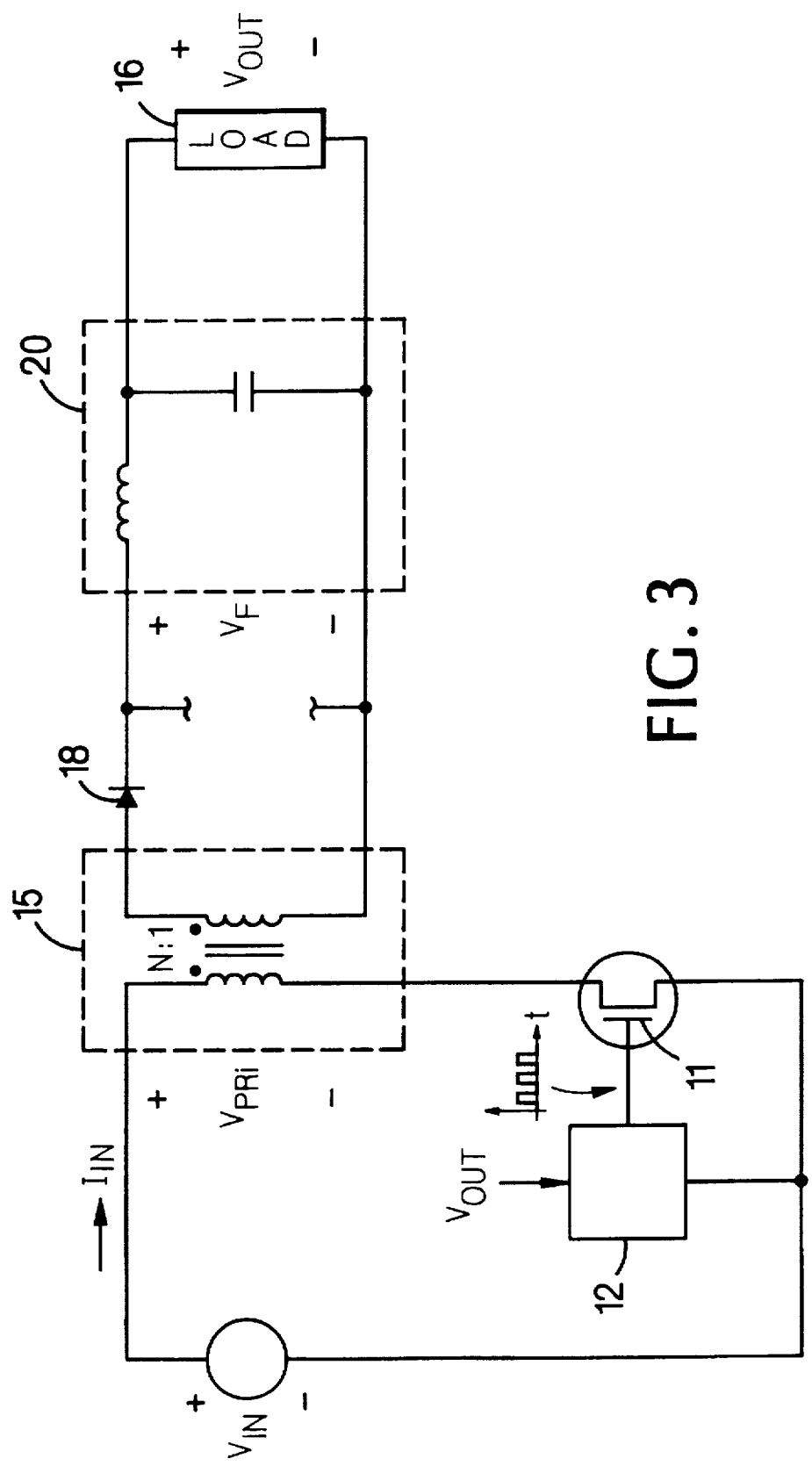
FIG. 3 is a circuit diagram of a portion of a buck converter.

An alternative implementation of a quasi-single stage converter eliminates switch 68, switch controller circuitry 66, and diode 64 (FIG. 5). The boost converter 10 in FIG. 7 includes the circuit components of the boost converter of FIG. 2, although, in general, any non-isolated boost topology could be used. In operation, the voltage controller 26 in the boost converter maintains the voltage Vc at a predetermined value, Vt, which is above the minimum operating voltage of the converter 62. When the voltage Vin is below Vt, the IPFC converter 61 will operate in essentially the same way as the IPFC converter 60 of FIG. 5. When Vin is above Vt, however, the voltage controller 26 will force the duty cycle of the switch 28 to be zero and the switch 28 will be off. With the switch 28 off, the voltage Vin will be impressed across the series circuit comprising the capacitor 69 and the diode 64. If the value of the capacitor 69 were large, connection of this circuit across Vin could substantially impact the power factor which the converter 61 presents to the AC line. Because the amount of power processed by the boost converter 10 is small, however, so too is the value of the capacitor 69.

Figure 7:
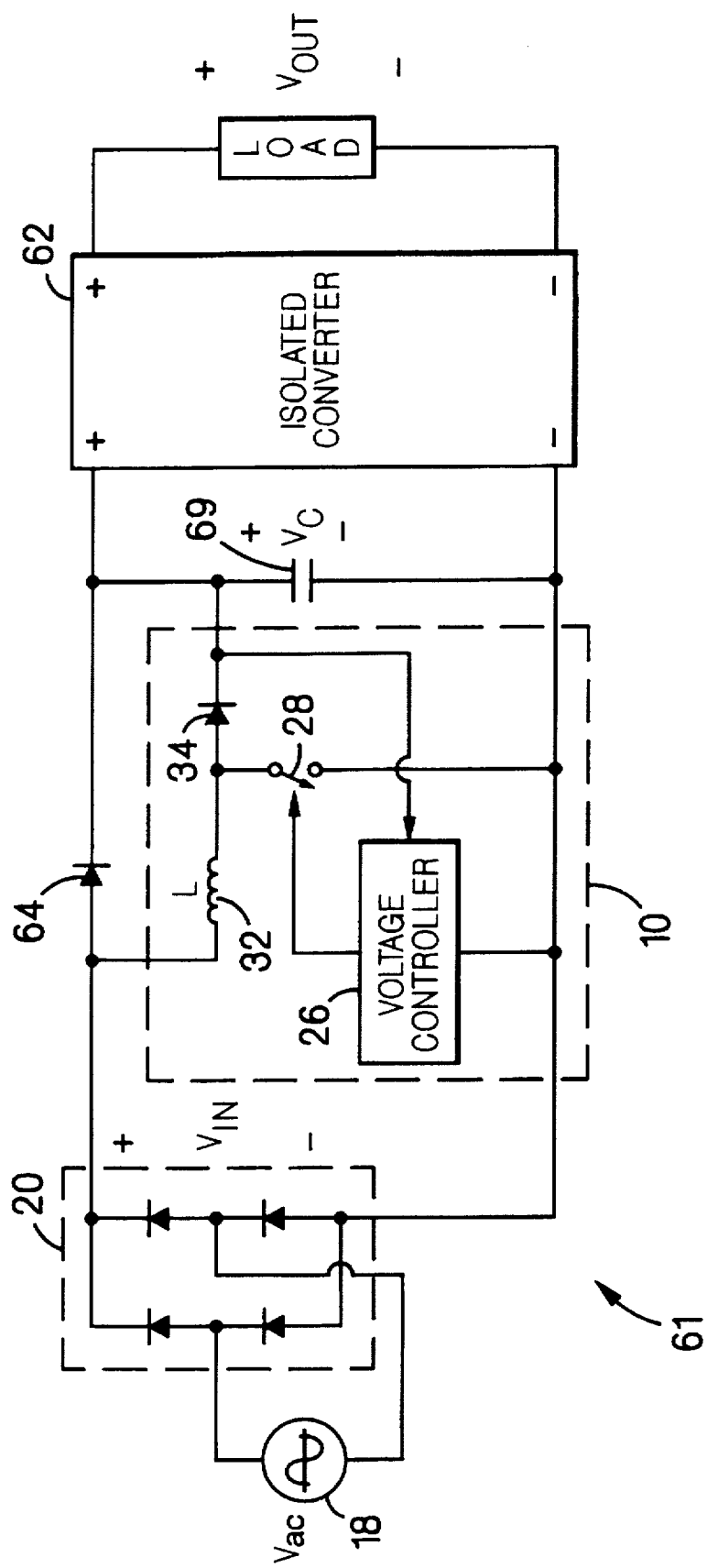
FIG. 7 is a schematic diagram of an alternative converter arrangement.

For example, in a practical converter 60 of the kind shown in FIGS. 5 and 7, designed to deliver up to 750 Watts to a load, the value of capacitor 69 is 1 microfarad (for comparison, in a practical implementation of a converter of the kind shown in FIG. 1, designed to operate at the same power level, several hundred microfarads of filter capacitor 22 would typically be required). For a converter of the kind shown in FIG. 7, impressing Vc across this small value of capacitance has only a minor impact on the power factor that the IPFC converter 61 presents to the AC source 18.

A benefit of the topology of FIG. 5 is that the components in the boost converter 10 need only withstand the relatively low voltages which are present when the switch 68 is closed. As Vin rises, and the switch opens, the combination of the switch 68 and the diode 65 protect the components in the boost converter 10 from elevated values of Vin. The boost converter may then be smaller and use less costly components. And semiconductor switches (e.g., power MOSFETs) having lower voltage ratings may be used, which improves conversion efficiency. Another benefit is that boost converters operating at low power and low voltage can be designed to operate at higher operating frequencies, also allowing smaller components. Also, in contrast to the topology of FIG. 7, the capacitor 69 of FIG. 5 is never passively connected across Vin and so will not affect power factor when the boost converter is not operating.

In other implementations of the IPFC converter of FIG. 5, switch 68 and switch controller 66 are included but the diode 65 is omitted and replaced with a short circuit. The effect of the capacitor 69 on power factor then will be essentially the same as in the converter 61 of FIG. 7, but the combined effect of the switch 68 and the output diode in the boost converter (e.g., diode 34, FIG. 2) will protect the majority of components in the boost converter 10 (e.g., in FIG. 7, switch 28, controller 26) from high values of Vin.

Embodiments of the boost converter 10 used in the IPFC converter 60 of FIG. 5 (as well as in all of the IPFC converter embodiments described herein) must maintain the voltage Vc at or above the minimum operating voltage of the isolated converter 62 while the controlled (by the PFC co controlled (by the PFC controller in the isolated converter 62) to follow the waveform of the line voltage. This requires that both the energy storage elements in the boost converter be relatively small and that the bandwidth of the converter be much greater than the AC source frequency. For example, with reference to FIGS. 2 and 5, a PWM boost converter was constructed for use in an IPFC converter designed to deliver 750 Watts to a load while operating over an AC line voltage range of 85 V, rms, to 264 V, rms (50 or 60 Hz line frequency). The activation threshold of the switch 68 (FIG. 5) was in the range of 50 to 70 Volts. The switch 68 was an IRF840 MOSFET, having a breakdown voltage rating of 500 V, manufactured by International Rectifier Corporation, El Segundo, Calif., USA. The value of inductor 32 (FIG. 2) was 60 microhenries. The value of the boost converter output capacitor 69 was 1 microfarad. The output diode 34 in the boost converter was a 50SQ100 Schottky diode and the boost converter switch 28 was an IRF540 MOSFET, each having a breakdown voltage rating of 100 V and each manufactured by International Rectifier. An integrated circuit controller, part number UC3842, manufactured by Unitrode, was used to control the boost converter at a switching frequency of approximately 150 KHZ. Diode 65 (FIG. 5) was a 1N5406 rectifier, manufactured by Motorola, Inc., Phoenix, Ariz. USA.

In many applications it is desirable for an IPFC converter to operate over a relatively wide range of AC input voltages, for example over a range from 85 VAC, rms to 264 VAC, rms (corresponding to a range of peak values of Vac and Vin of 120 Volts to 373 Volts). This would require that the isolated converter 62 be able to operate at input voltages approaching 400 Volts, DC. If the minimum input operating voltage of the isolated converter were 50 Volts, then the converter would have to have an 8:1 range of input operating voltage. As a practical matter, both the operating efficiency and power density of typical isolated converters degrade as the input operating voltage range increases. In general, then, it is desirable to minimize the operating voltage range of the converter 62.

Figure 8:
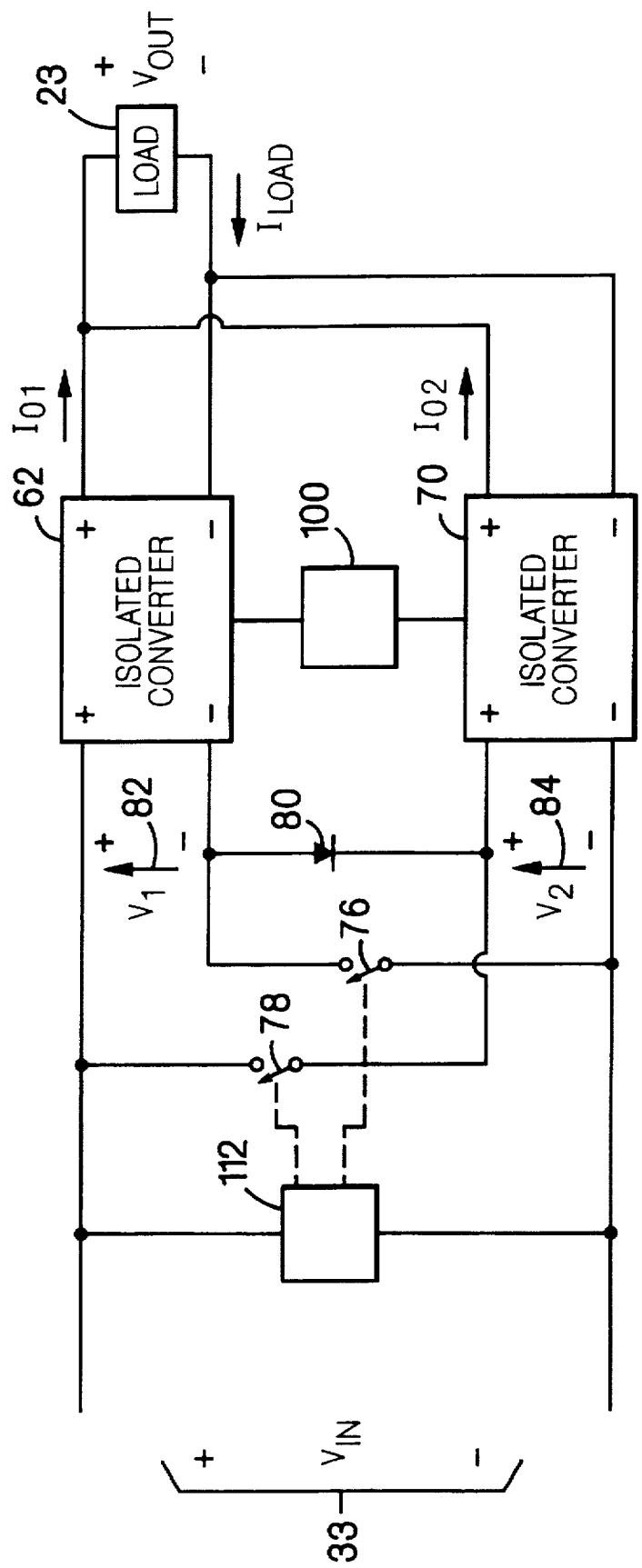
FIG. 8 is a diagram of a circuit for selectively connecting the inputs of two power converters either in series or in parallel.

In FIG. 8, isolated converters 62, 70 may be used to operate over a range of variation of converter input voltage Vin 33 which is greater than the input operating range of the converters themselves. The outputs of two isolated converters 62, 70 are connected in parallel, and made to share in delivering current to the load 23, Iload, by current sharing circuitry 100. For example, if the converters 62, 70 include power conversion circuitry of the kind which deliver power by means of quantized energy transfer, then current sharing may be achieved by connecting the converters in any of the master-booster arrangements described in Vinciarelli, "Power Booster Switching at Zero Current," U.S. Pat. No. 4,648,020 (incorporated by reference). Thus, converter 70 may be a driver module, and converter 62 a booster module. The booster module may be operated synchronously and in phase with the driver module (in which case the current sharing controller would simply be circuitry which carries operating frequency information from driver module 70 to booster module 62; see, for example, FIG. 12). Or the booster module may be synchronized with a phase delay to reduce conducted noise reflected from the converter inputs back towards the AC source. In either case, the natural power sharing characteristic of zero-current switching converters (and other kinds of quantized power converters) will cause the current delivered by each converter, Io1 and Io2, to be a predictable fraction of the total amount of current, Iload, delivered to the load 23.

If converters 62, 70 share equally in delivering power to a load, they will also draw essentially equal amounts of power at their inputs. If the inputs to the converters 62, 70 are connected in series across an input source, the average voltages across the inputs of the two converters will be essentially the same.

Switches 76, 78 alternate the inputs of the isolated converters between series and parallel connection. Assume, for example, that each converter 62, 70 has an input operating range of 50 V to 200 V (a 4:1 range). When Vin is below a reconfiguration threshold of between 180 and 200 V, switches 76, 78 are closed by reconfiguration controller 112. Diode 80 connecting the isolated converters is reverse biased. The inputs to the isolated converters are thus in parallel, and the input voltages 82, 84 to the two isolated converters are the same and equal to Vin.

When the input voltage Vin 33 is above the reconfiguration threshold voltage, switches 76, 78 are opened by the reconfiguration controller 112, thereby connecting the inputs of the two isolated converters 62, 70 in series with each other and with diode 80. Since Vin divides essentially equally across the inputs of the two converters, the series connection of the isolated converters allows increasing the value of Vin to a value which is twice the maximum rated input voltage of the converters 62, 70. Then a pair of converters having a minimum input operating voltage of 50 V and a maximum input operating voltage of 200 V (a 4:1 input voltage range) can be used to handle values of Vin up to 400 V. Thus the total effective input operating range has been increased to 8:1, or double the range of either of two converters 62, 70 taken alone.

Figure 9:
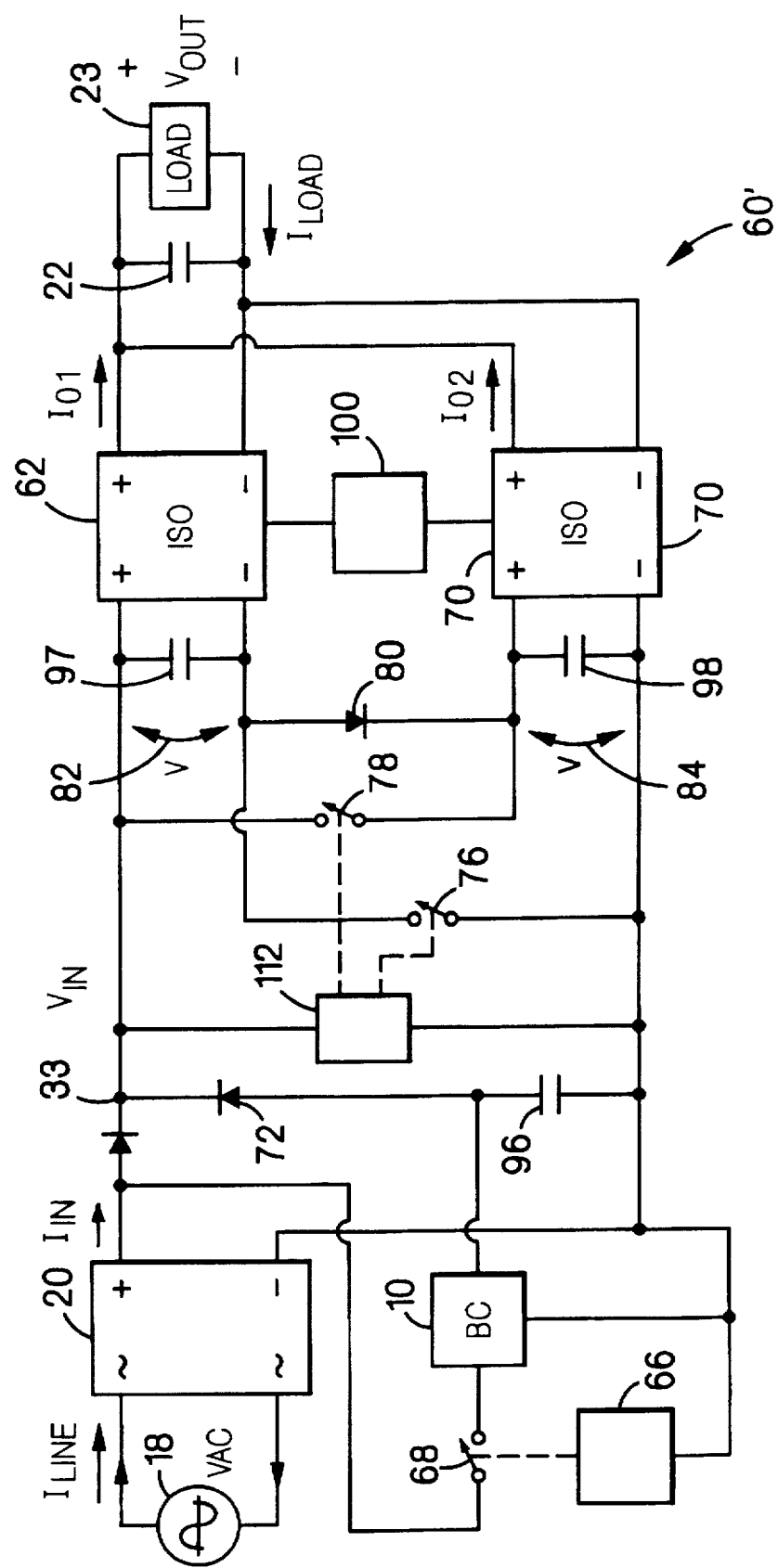
FIG. 9 is a circuit diagram of another quasi-single stage IPFC converter.

The technique of FIG. 8 may be used in the quasi-single stage topology of FIG. 5 to allow use of isolated converters having an input operating range which is reduced relative to the range of variation of the AC source voltage. The modified circuit 60', shown in FIG. 9, has two isolated converters 62, 70 each having a 50–200 V input (4:1) range. A boost converter 10, activated by switch 68 via control circuitry 66, maintains a 50 V output at node 33 when the input voltage, Vin, is below 50 V. The output of the boost converter is fed to the input of the isolated converters 62, 70 via a diode 72 which disconnects the boost converter 10, and capacitor 96, from Vin when the input voltage Vin is above 50 V peak.

Capacitor 22 stores energy as the power factor corrected input current Iin, and the converter output currents, Io1 and Io2, fluctuate during each line cycle. The capacitor 22 charges during times of high converter 62, 70 power output and discharges when the power outputs are low, thus minimizing fluctuations in the voltage across the load 23.

Reconfiguration controller 112 measures Vin and controls the opening and closing of switches 76, 78 to alternate the inputs of the isolated converters 62, 70 between a series and parallel connection, as described above. Thus, converters having a minimum input operating voltage of 50 V and a maximum input operating voltage of 200 V (a 4:1 input range) can be used in an IPFC converter 60' capable of handling lines having peak voltages up to 400 V (e.g., an AC source voltage 18, Vac, of up to 282 VAC, rms).

Figure 10:
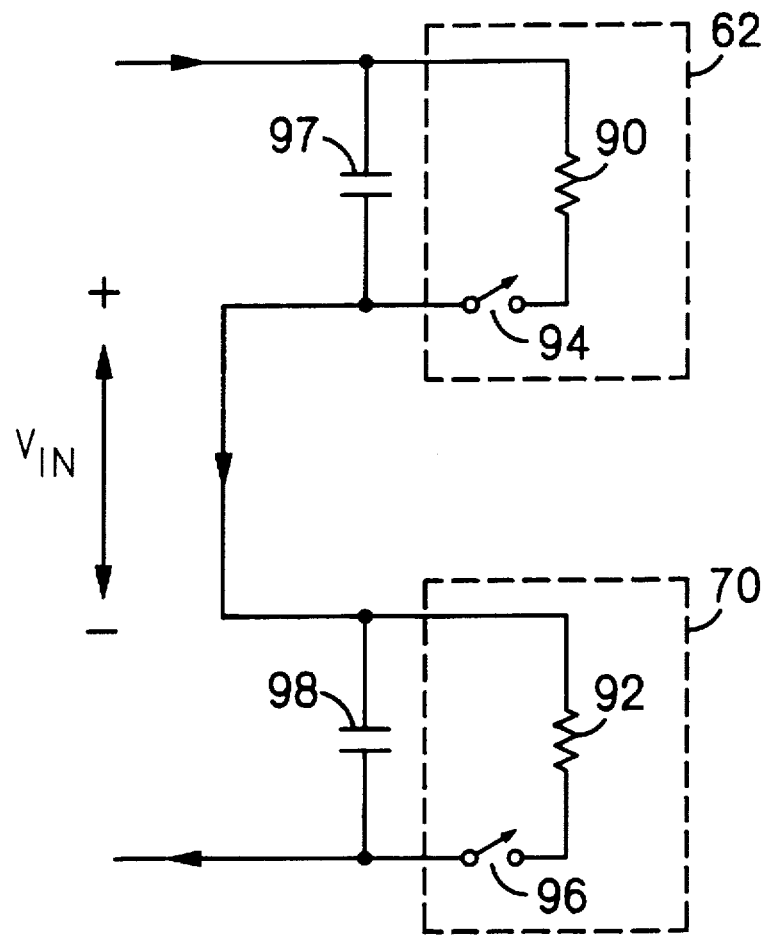
FIG. 10 is a circuit diagram modeling a portion of the converter of FIG. 9.

One issue in series-connecting the converters 62, 70 is illustrated in FIG. 10. Each converter module is represented by a switching element 94, 96 in series with a load. The switching elements are representative of switches which are typically included in the power conversion circuitry in such a converter and which are opened and closed at switching frequencies much greater than the frequency of the AC source (e.g., source 18, FIG. 9). If the switching elements 94, 96 are opened and closed at different points in time the voltage Vin could divide unevenly across the inputs of the two converters (on a transient basis) which might overstress the unit exposed to the higher voltage. To prevent this, a small capacitor (e.g., 0.1 microfarads) may need to be placed across the inputs of each converter 62, 70 to smooth the voltage during any such transient condition.

Figure 11A:
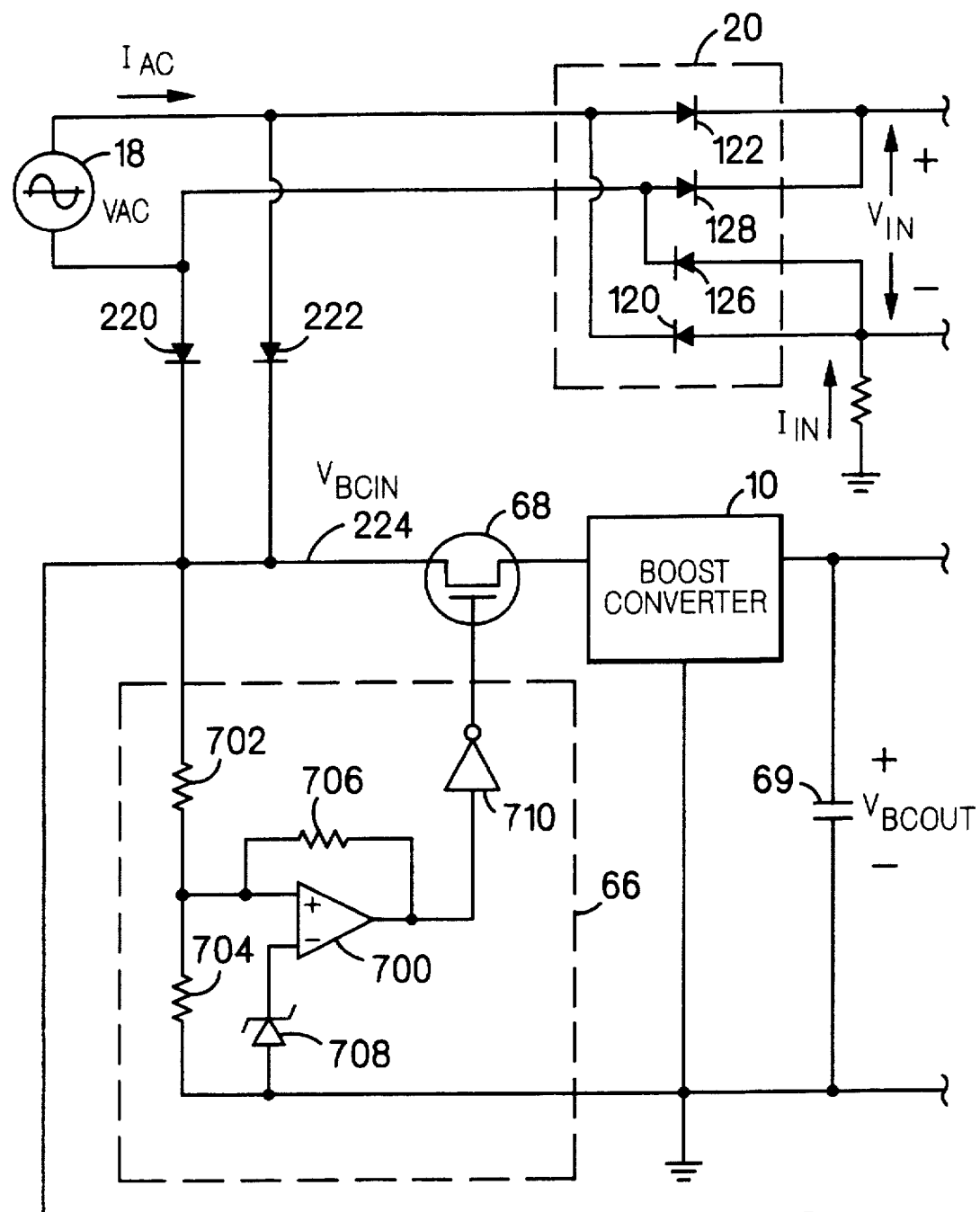
FIGS. 11A-11C are circuit diagrams of a quasi-single stage IPFC power converter.
Figure 11B:
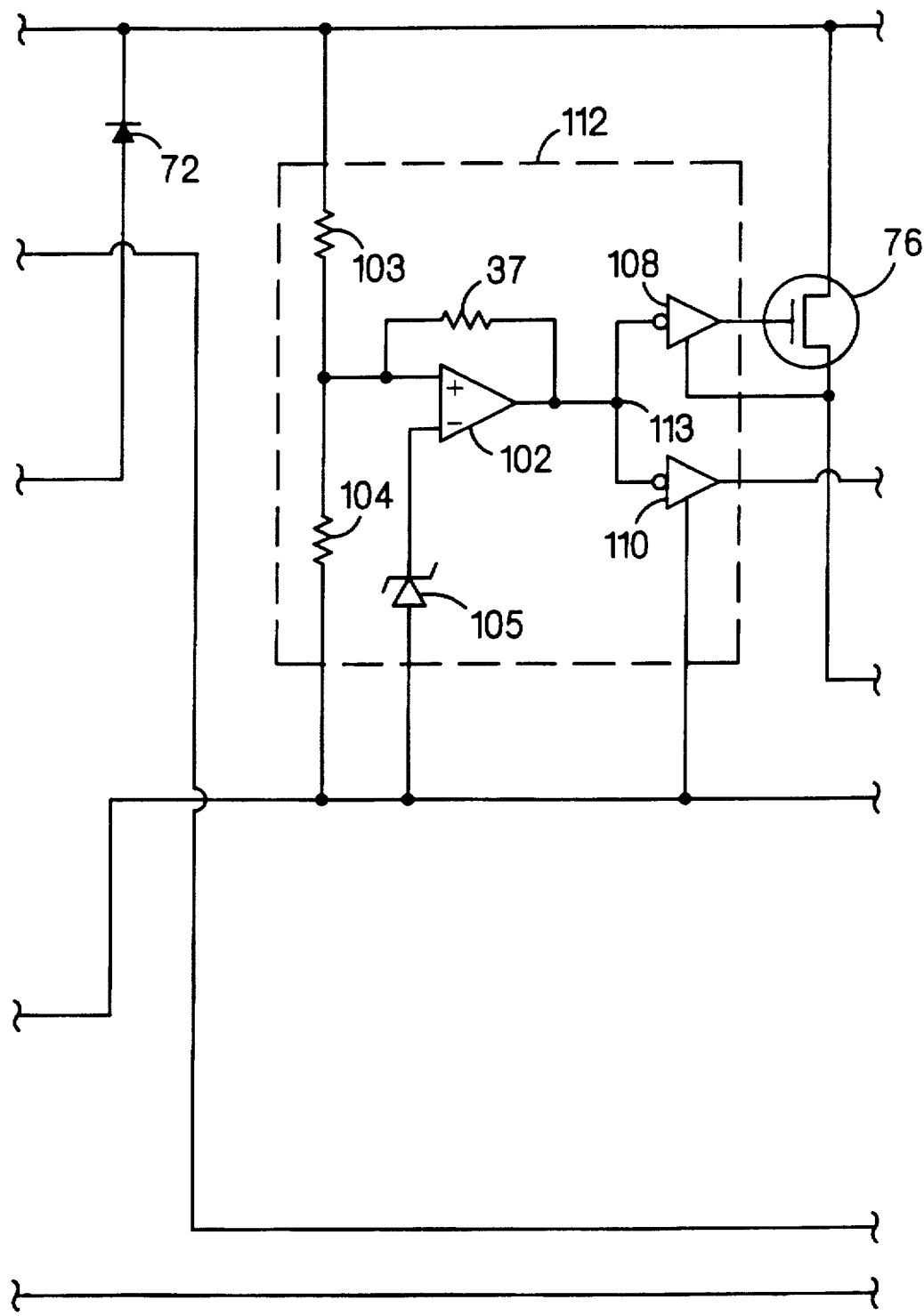
Figure 11C:
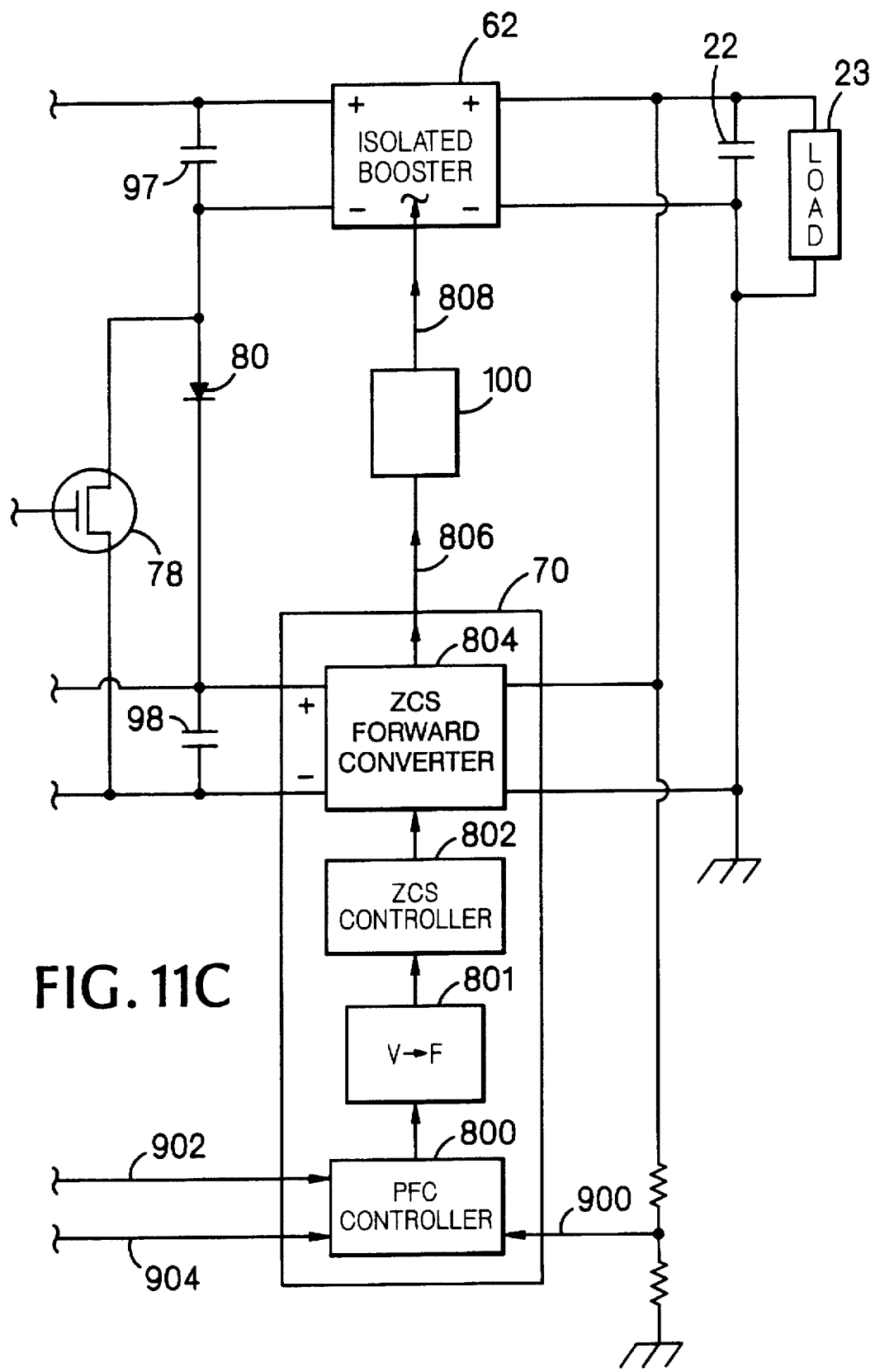

In FIG. 11, reconfiguration controller 112 alternates the inputs of the isolated converters 62, 70 between series and parallel connection, when the line input voltage 18 has a magnitude above and below 180 V, respectively. The reconfiguration controller 112 has a comparator 102 with inputs from a voltage divider composed of resistors 103, 104 and a reference voltage 105. Resistor 37 introduces hysteresis into the controller 112 to reduce the possibility of noise causing spurious switching of the comparator 102. The output of the comparator is a signal that can assume a high or a low value.

Resistors 103, 104 are chosen so that when the input voltage 18 is at 180 V, the voltage at input 106 of the comparator is slightly larger than the reference voltage 105, and the output voltage of the comparator is at its high value. This high value is delivered to inverting switch drivers 108, 110, opening MOSFET switches 76, 78 and placing the isolated converter inputs in series, as required.

Similarly, when Vin is below 180 V, resistors 103, 104 provide a voltage lower than the reference voltage 105, so that the output of comparator 102 changes to its low value. The inverting switch drivers 108, 110 then switch their outputs to their high value, which closes switches 76, 78, placing the inputs of isolated converters 62, 70 in parallel.

In FIG. 11 the boost converter 10 is connected to the AC source differently than in FIG. 5, where a single full wave rectifier 20 supplies rectified line voltage (Vin) to the boost converter. The FIG. 5 scheme requires diode 64 to isolate the boost converter output voltage, Vc, from Vin during the time that Vin is below Vc. As Vin rises and the boost converter ceases operating, all of the current delivered from the AC source to the isolated converter 62 must flow through three diodes: two diodes in the full-wave rectifier 20 and diode 64. This occurs when the current Iin is relatively high, so the presence of diode 64 will cause unnecessary losses. In FIG. 11, two additional diodes 220, 222 are added which, in combination with diodes 120, 126 act as a full wave rectifier at the input to the boost converter. With the additional two diodes 220, 222 shown in FIG. 11, diodes 122, 118 in the full wave rectifier of FIG. 11 will perform the function of the diode 64 in FIG. 5—isolating the boost converter input and output when the absolute value of Vac is below the voltage delivered by the boost converter. With this alternate arrangement only two diodes (in the full wave rectifier 20) carry current between the AC source and the isolated converters 62, 70 while the boost converter is non-operational. This reduces total diode losses by one-third. Also, because the two additional diodes 220, 222 only carry current at times when the boost converter 10 is operating and the current Iin is relatively low, the diodes 220, 222 may be small and economical, and will exhibit low loss.

Resistors 702, 704 in switch control circuitry 66 connect to diodes 220, 222 and deliver a fraction of the rectified AC voltage to an input of comparator 700. When the value of this voltage exceeds the switch activation threshold (delivered to the other input of the comparator by reference voltage source 708) the output of the comparator goes high; the inverting driver 710 turns the MOSFET switch 68 off; and the boost converter is disabled and disconnected from the rectified AC voltage.

FIG. 11 also shows details of how zero-current switching converters may be used in a power sharing arrangement. In the Figure, isolated converter 70 is a driver module which is shown to contain a Power Factor Correcting controller 800, a voltage-to-frequency converter 801, a zero-current switching controller 802, and an isolated zero-current switching forward converter 804. The PFC controller 800 accepts three inputs 900, 902, 904, indicative, respectively, of the load voltage Vout, the current drawn by the converter Iin, and the waveshape of the rectified AC source voltage. The controller 800 delivers a voltage to the voltage-to-frequency converter 801 indicative of the frequency at which the ZCS converter 804 must operate so that the input current Iin follows the waveshape of the voltage Vin and the load voltage is at the desired value Vout. The voltage-to-frequency converter 801 and the ZCS controller 802 turn the switch in the ZCS forward converter on and off, at times of zero current, at a rate called for by the PFC controller. A frequency signal 806, which is a pulse train at the operating frequency, fop, of the driver module, is delivered to isolated converter 62, a zero-current switching booster module, by power sharing circuitry 100. Synchronization signal 808, also a pulse train at frequency fop, is delivered to the booster module 62. When synchronized, the driver 70 and the booster 62 modules will naturally share in the power delivered to the load 23.

Figure 12A:
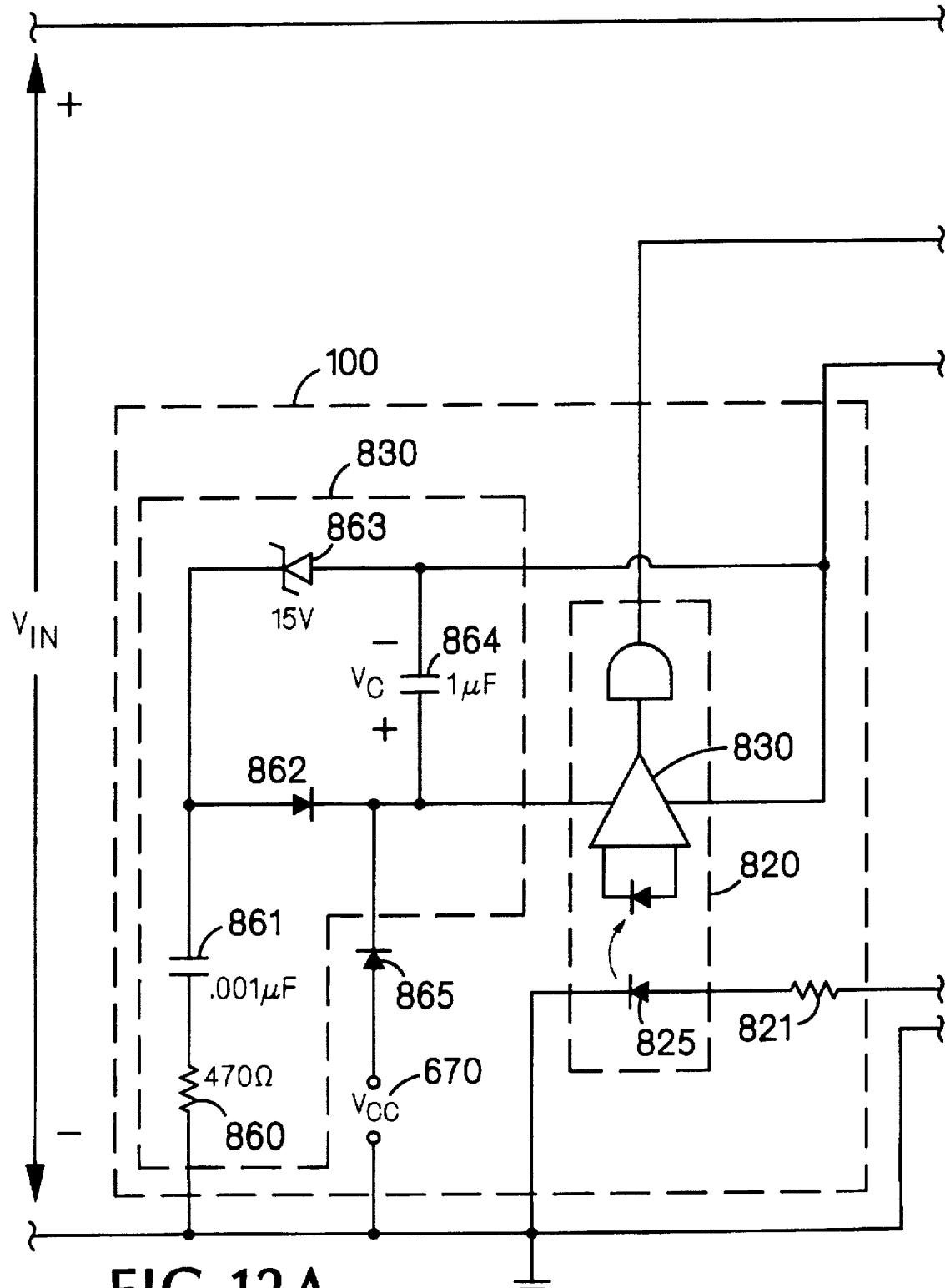
FIGS. 12A-12B are circuit diagrams showing additional details of a portion of the circuit of FIG. 11.
Figure 12B:
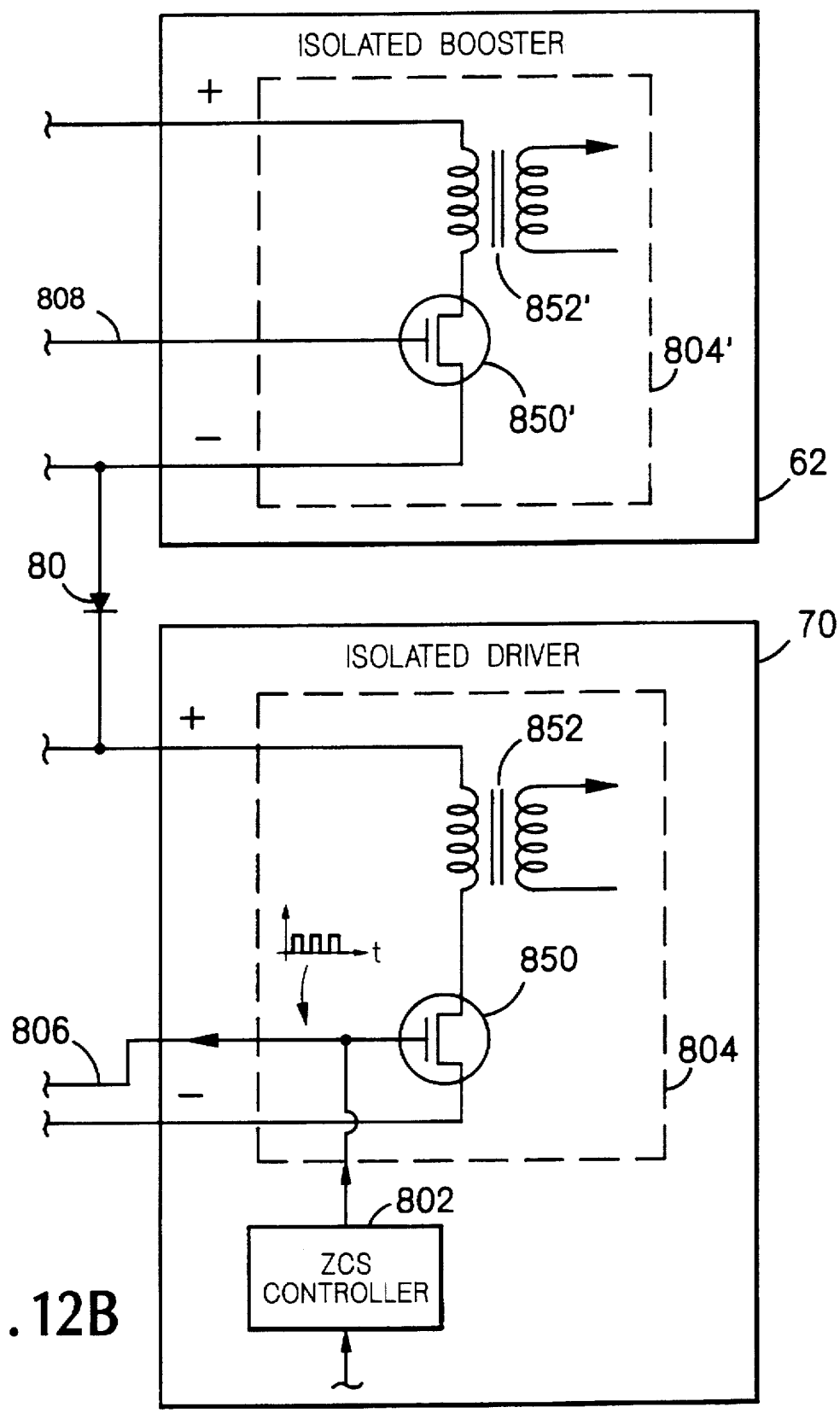

One way to implement power sharing circuitry 100 is shown in FIG. 12. In the Figure, which shows a portion of the converter 60' of FIG. 11, the MOSFET switching element 850 in the isolated driver module 70 is shown being driven by a pulse train delivered by ZCS controller 802. This pulse train, which pulsates between a low value of essentially zero volts and a high value of between 10 and 15 volts, is the frequency signal 806 which is delivered, via current limiting resistor 821, to the light emitting diode 825 at the input of high speed coupler 820 (e.g., an HPCL-2200 high speed opto-coupler manufactured by Hewlett-Packard Components Group, San Jose, Calif., USA). The light output of the diode is received by driver circuitry 830, also included in the high speed coupler 820, and is output as a synchronization signal 808 at the same frequency as the frequency signal 806. The synchronization signal is delivered to the MOSFET switch 850' included in the ZCS forward converter 804' in booster module 62. The galvanic isolation of the high speed coupler is required for synchronizing the two modules 62, 70 because when the module inputs are configured in series the switches 850, 850' do not share a common signal return. FIG. 12 also shows details of how bias voltage, Vc, for the driver circuitry 830 may be derived in a power factor correcting application. If the converter inputs are connected in parallel then both converter negative inputs will be connected together and a bias source 670, of voltage Vcc, referenced to the negative return of the driver module 70 can supply power to the driver circuitry 830 via diode 865. When the inputs of the converters 62, 70 are connected in series, however, the rise and fall of Vin (at twice the frequency of the AC source; e.g., 100 or 120 Hz) will transfer energy to storage capacitor 864 via charge pump circuitry 830 (consisting of resistor 860, pump capacitor 861, pump diode 862, storage capacitor 864 and 15V clamp zener diode 863, all of whose values are shown in the Figure).

Figure 13:
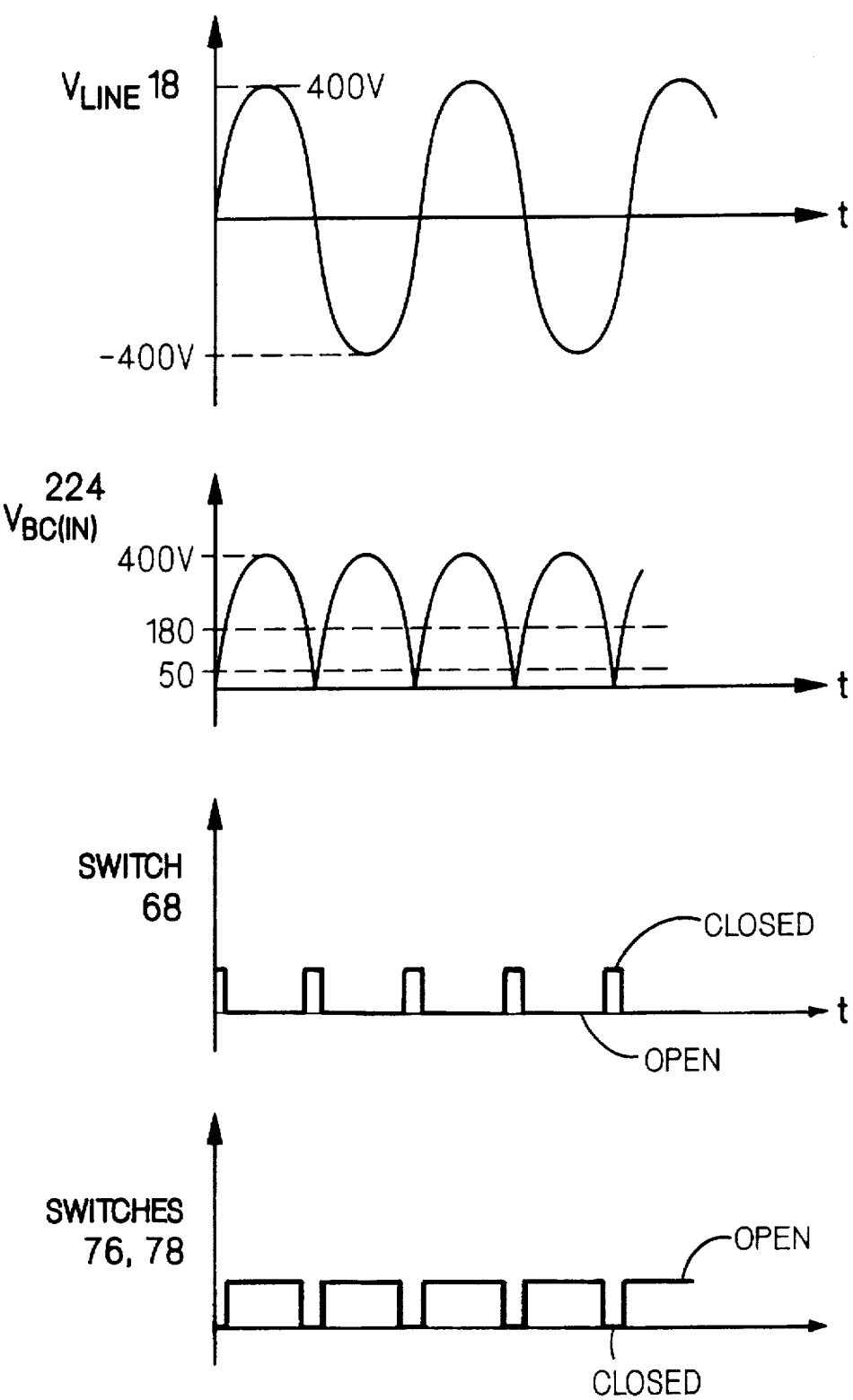
FIG. 13 shows waveforms for the converter of FIG. 12.

FIG. 13 summarizes the operation of the power conversion circuit 60' over an energy cycle. The AC input voltage 18 is first converted to the rectified input voltages Vin 33 and VBCIN 224. Control unit 66 closes switch 68 when VBCIN is at, or slightly above, 50 V, and the boost converter maintains its output VBCOUT 226 at 50 V. Because the rectified input voltage 33 is at or below 50 V, power is delivered through the boost converter to the isolated converters. Also, the reconfiguration controller holds both switches 76, 78 closed, thus connecting the inputs of the isolated converters 62, 70 in parallel across Vin 33.

When the rectified input voltage 33 exceeds 50 V, switch 68 is opened, and the boost converter stops operating. Power flows directly through the full wave rectifier 20 into the isolated converters 62, 70.

As the energy cycle continues and the rectified input voltage 33 reaches 180 V, the reconfiguration controller 112 opens switches 76, 78 to place the inputs of isolated converters 62, 70 in series with each other and with diode 80. When the rectified input voltage eventually falls to 180 V, the switches are again closed, and the isolated converters are connected in parallel. When the rectified input voltage further drops to 50 V, switch 68 is closed again, and the entire cycle repeats.

Efficiency can be further improved by alternating the outputs of the two isolated power converters between a series and parallel connection. The series connection compensates for the fact that below a certain input voltage threshold, each isolated converter is unable to maintain the desired output voltage. In theory, an isolated buck converter with an internal isolation transformer having a primary-to-secondary turns ratio N is limited to delivering an average output voltage Vo only when its input voltage is above N*Vo. Thus, for example, an isolated converter producing an output voltage of 5 VDC, and having an isolation transformer with a turns ratio N=10, will not be able to maintain its output voltage in regulation if the converter input drops below 50 V.

Figure 14:
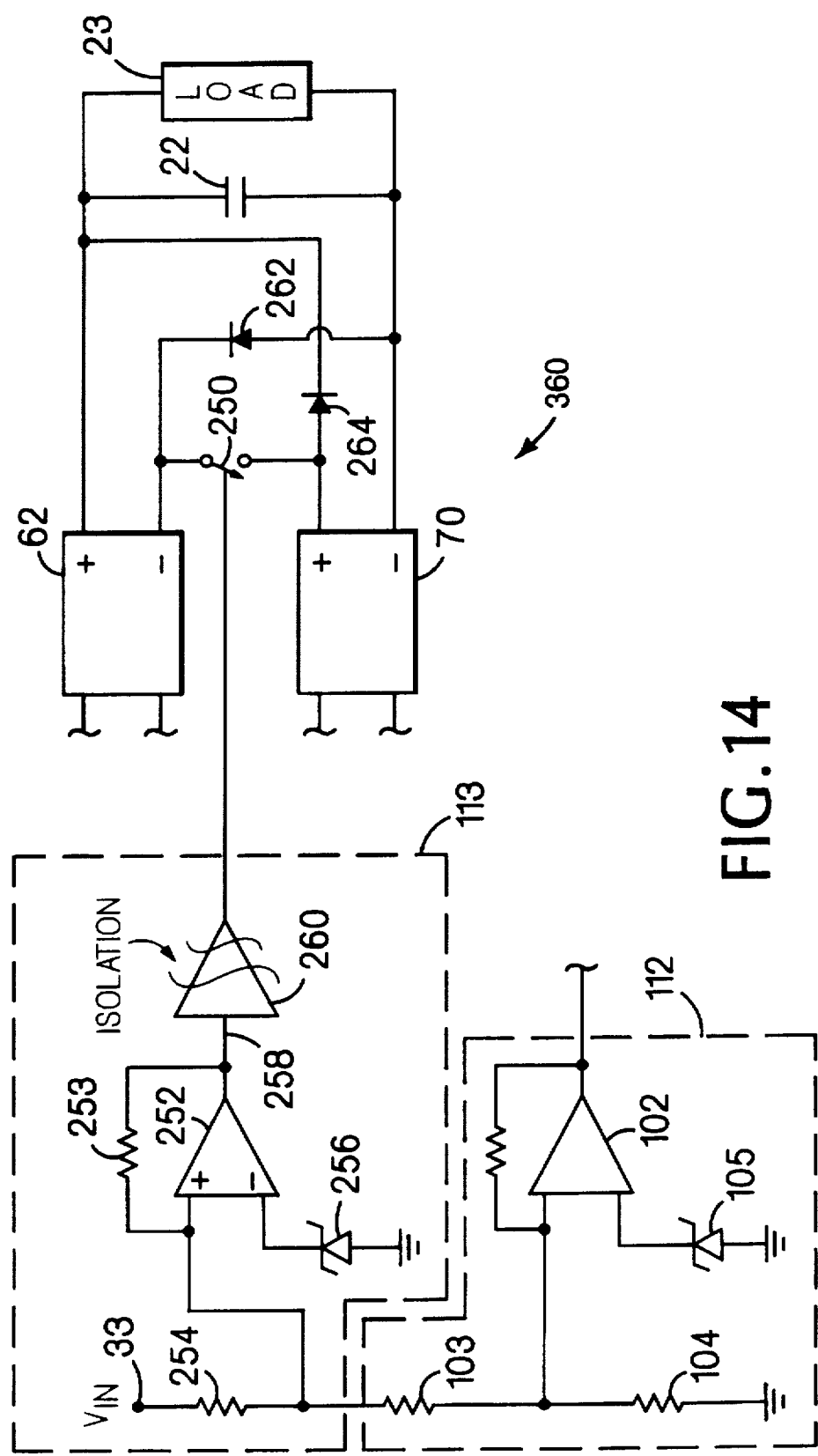
FIG. 14 is a diagram of a circuit for selectively connecting the outputs of a pair of converters in series or in parallel.

A way to deliver 5 V when the input voltage drops below 50 V is shown in FIG. 14. In IPFC converter 360 (only a portion of which is shown), a switch 250 and two diodes 262, 264, provide for connecting the outputs of two isolated converters 62, 70 either in series or in parallel. When switch 250 is closed the outputs of the isolated converters are connected in series and each isolated converter need only deliver 2.5 V at its output to maintain the total output voltage at 5V. Each isolated converter can continue to maintain a 2.5 V output down to a 25 V input, so that the input operating range of the pair of converters 62, 70 is effectively doubled. When the switch 250 is opened, the converter outputs are paralleled via diodes 262, 264.

FIG. 14 also shows how the output switching technique may be incorporated into the IPFC converter of FIG. 11. An output switch controller 113 is added (in addition to the reconfiguration controller 112). A resistive divider (resistor 259 in series with the resistor string used by the reconfiguration controller 112) and a reference voltage source 256, indicative of a voltage, Vx, slightly above the minimum input operating voltage of the converters 62, 70, are fed into comparator 252. As Vin drops below Vx the comparator output signal 258 changes to a state which turns switch 250 on. Because the output switch controller 113 and the switch 250 are on different sides of the isolation barrier, the comparator output signal 258 is delivered to the switch 250 by a galvanically isolated driver 260 (e.g., an opto-coupler).

If both output switching (via output switch controller 113) and input switching (via reconfiguration controller 112) are used in an IPFC converter 360, the overall improvement in equivalent input operating range may be as great as a factor of 4. For example, if the converters have a 4:1 input operating the equivalent input operating range is increased to 16:1. An IPFC converter 360 using converters 62, 70 having minimum and maximum input voltage ratings of 50 V and 200 V, respectively, will be able to operate at values of Vin between 25 V and 400 V, corresponding to AC line voltages between 17.7 VAC, rms and 283 VAC, rms. Another benefit of reducing the equivalent input operating voltage is that the boost converter 10 operating threshold may be lowered by almost a factor of two (e.g., to around 25 V), further reducing the amount of power processed by the boost converter 10 and further improving the overall efficiency of the IPFC converter 360.

Figure 15:
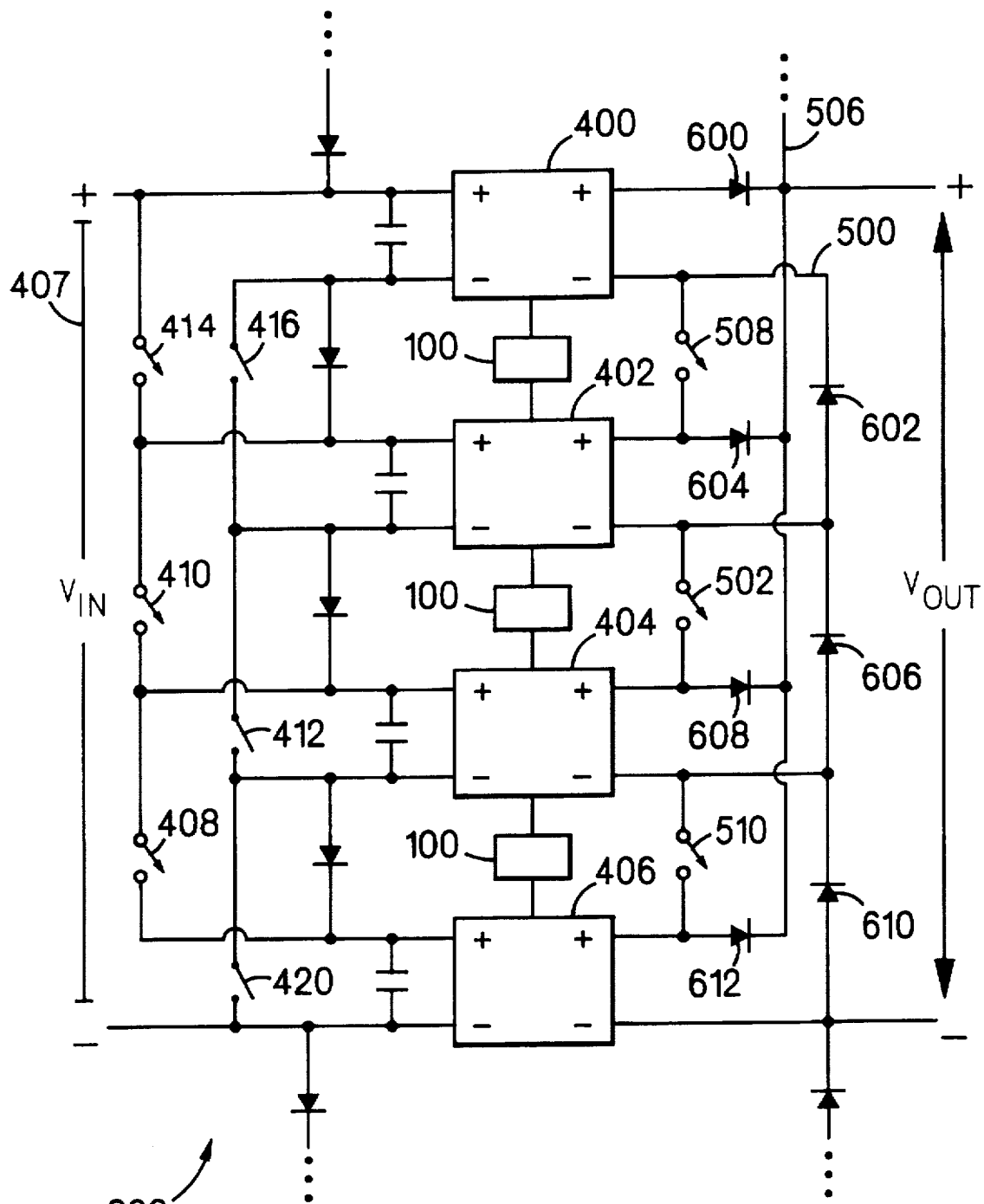
FIG. 15 is a circuit diagram of another power converter.

Because selectively connecting converter inputs and outputs in series and parallel increases both input operating voltage range and operating efficiency, it is a fruitful approach in a wide variety of applications. The scheme is not limited to a pair of converters; the number of converters connected in series may be increased indefinitely to extend the upper threshold of the power conversion to any desired value. In the example of FIG. 15, a power conversion circuit 399 has at least four converters 400, 402, 404, 406 each characterized by a minimum input operating voltage, y, and a maximum input operating voltage x (and an input operating range of x:y). For values of input voltage, Vin 407, between x and y, the inputs of the converters are connected in parallel by closing switches 410 through 420 in the circuit. When the input voltage approaches the maximum input operating voltage, x, switches 410, 412 are opened, connecting the parallel pair of converters 400, 402 in series with the parallel pair 404, 406. As explained above in connection with FIG. 11, the maximum input operating voltage is thus doubled to 2x. Similarly, as Vin approaches a value 2x, switches 414, 416, 418, 420 are opened, connecting the inputs of all four converters in series and increasing the maximum input operating voltage to 4x. Thus, a series connection of 2n converters may be used to provide a maximum input operating voltage of 2nx. A controller for switches 410 through 420 is a simple extension of the reconfiguration controller 112.

Switching the outputs of two converters from a series to a parallel connection may also be extended to any number of power converters (e.g., 2n) to decrease the lower threshold y of the conversion circuit to y/2n. For example, as shown in FIG. 15, when the input voltage 407 is above y volts the outputs of all of the converters 400, 402, 404, 406 are connected in parallel via diodes 600 through 612. As Vin declines toward y volts, switch 502 is closed connecting the paralleled outputs of the pair of converters 400, 402 in series with the paralleled outputs of the pair of converters 404, 406. Then each converter need only deliver Vout/2 volts (neglecting voltage drops in diodes and switches) to maintain a total converter 399 output of Vout, and, as discussed above, this reduces the minimum operating voltage of the converter 399 to y/2. If the input voltage further decreases below y/2 volts, switches 508, 510 are thrown so that the outputs of all four converters are in series. Each converter need now only deliver Vout/4 volts, which extends the minimum input operating voltage down to y/4 volts. If the output of 2n converters are connected in series, the power conversion circuit can continue to produce an output of Vout volts down to an input voltage of y/2n.

A switch controller for the converter outputs is a simple extension of the dual output switch converter 113.

Other embodiments are within the scope of the following claims. For example, the isolated converters may be of any converter topology (e.g., PWM, resonant); and any of the converters may be isolated or non-isolated.

What is claimed is:

1. Apparatus for converting power from a varying voltage source and delivering it to a load, comprising
   boost conversion elements for effecting a boost conversion of power originating from the varying voltage source,
   additional conversion elements for also effecting conversion of power originating from the varying voltage source, and
   a power factor correcting controller for causing variations in current drawn from the voltage source to follow variations in voltage of the voltage source.

2. The apparatus of claim 1 further comprising
   circuitry for selectively configuring the conversion elements with respect to delivery of power to the load to achieve greater conversion efficiency than if all of the power delivered to the load were constrained to flow through the additional conversion elements and at least some of the boost conversion elements.

3. The apparatus of claim 2 wherein the circuitry selectively configures the conversion elements so that during some periods the power delivered to the load is constrained not to flow through the boost conversion elements.

4. The apparatus of claim 2 wherein the power is constrained not to flow through the boost conversion elements more than half of the time.

5. The apparatus of claim 2 wherein the circuitry selectively configures the conversion elements based on the voltage level of the varying voltage source.

6. The apparatus of claim 2 wherein the circuitry selectively configures the conversion elements based on when the voltage level of the varying voltage source falls within a specific range of values.

7. The apparatus of claim 2 wherein the circuitry selectively configures the conversion elements based on when the voltage level of the varying voltage source passes a threshold.

8. The apparatus of claim 7 wherein the threshold is based on a minimum input operating voltage of the additional conversion elements.

9. The apparatus of claim 1 wherein power converted by the boost conversion elements is delivered to the additional conversion elements for further conversion.

10. The apparatus of claim 9 wherein all of the power converted by the boost conversion elements is delivered to the additional conversion elements for further conversion.

11. The apparatus of claim 9 wherein power converted by the boost conversion elements is delivered to the additional conversion elements via a unidirectional element biased to permit current to pass only from the boost conversion elements toward the additional conversion elements.

12. The apparatus of claim 9 wherein power converted by the boost conversion elements is delivered via a short circuit path directly to the additional conversion elements.

13. The apparatus of claim 3 wherein during the periods when the power is constrained not to flow through the boost conversion elements, it is delivered from the voltage source to the additional conversion elements via a unidirectional component.

14. The apparatus of claim 1 wherein the voltage source is connected to the boost conversion elements via a switch which in one state disconnects the voltage source from the boost conversion elements.

15. The apparatus of claim 2 wherein the voltage source is connected to the boost conversion elements via a short circuit path.

16. The apparatus of claim 15 wherein the circuitry for selectively configuring the conversion elements comprises a switch controller for controlling the switch.

17. The apparatus of claim 1 wherein the additional conversion elements have a minimum input operating voltage and the boost conversion elements deliver power to the additional conversion elements at a voltage which is greater than the minimum input operating voltage of the additional conversion elements.

18. The apparatus of claim 1 wherein the additional conversion elements provide galvanic isolation between the source and the load.

19. The apparatus of claim 1 wherein the power factor correcting controller is associated with the additional conversion elements.

20. The apparatus of claim 1 wherein the power factor correcting controller regulates the voltage across the load to a predetermined value.

21. The apparatus of claim 1 wherein the voltage source comprises an AC source and further comprising a rectifier for rectifying the AC source.

22. The apparatus of claim 21 wherein the rectifier comprises a full wave rectifier.

23. The apparatus of claim 21 wherein the rectified power from the input power source is delivered via a short circuit path directly to the input of the boost conversion elements.

24. The apparatus of claim 17 wherein the voltage source comprises an AC source and further comprising a rectifier for rectifying the AC source.

25. The apparatus of claim 24 wherein the rectifier comprises a full wave rectifier.

26. The apparatus of claim 1 wherein the additional conversion elements comprise a pair of converters operating in a power sharing arrangement.

27. The apparatus of claim 26 further comprising reconfiguration control circuitry for connecting the pair of converters either in series or in parallel.

28. The apparatus of claim 26 wherein said power sharing arrangement comprises power sharing control circuitry.

29. The apparatus of claim 26 wherein the reconfiguration control circuitry connects the pair of converters in series when the voltage of the input source crosses a threshold.

30. The apparatus of claim 29 wherein the reconfiguration control circuitry connects the pair of converters in parallel when the voltage of the input source crosses a threshold.

31. The apparatus of claim 29 or 30 wherein the threshold is related to the maximum input operating voltage of either converter.

32. The apparatus of claim 26 wherein the converters share essentially equally in the power delivered to the load.

33. The apparatus of claim 26 wherein the converters comprise ZCS converters.

34. The apparatus of claim 33 wherein one of the ZCS converters comprises a booster and the other ZCS converter comprises a driver.

35. The apparatus of claim 33 wherein each of the converters of the pair has a positive input and a negative input, and further comprising a switch connecting the positive inputs of the two converters, a switch connecting the negative inputs of the two converters, and a diode connecting the positive input of one of the converters to the negative input of the other converter.

36. The apparatus of claim 1 wherein the additional conversion elements comprise more than two converters operating in a power sharing arrangement.

37. The apparatus of claim 26 further comprising output control circuitry for connecting the outputs of the pair of converters either in series or in parallel.

38. The apparatus of claim 37 wherein the output control circuitry connects the outputs of the pair of converters in series when the voltage at the input of the converters crosses a threshold.

39. The apparatus of claim 37 wherein the output control circuitry connects the outputs of the pair of converters in parallel when the voltage at the input of the converters crosses a threshold.

40. The apparatus of claim 38 or 39 wherein the threshold is related to the minimum input operating voltage of either converter.

41. The apparatus of claim 1 further comprising separate full wave rectifier circuits, the first rectifier circuit being interposed between the input source and the boost conversion elements, and the second rectifier circuit being interposed between the input source and the additional conversion elements.

42. The apparatus of claim 41 wherein the output of the second rectifier circuit is connected by a short circuit path to the input of the additional conversion elements.

43. The apparatus of claim 41 wherein the rectifier circuits comprise six unidirectional elements forming two bridges each having four of the unidirectional elements, two of the unidirectional elements belonging to both bridges, one of the bridges having its output connected to the boost conversion elements, the other having its output connected to the additional conversion elements.

44. A method for converting power from a varying voltage source and delivering it to a load, comprising causing a boost conversion of power originating from the varying voltage source in boost conversion elements, another conversion of power originating from the varying voltage source in additional conversion elements, and power factor correcting the conversion of power.

45. The method of claim 44 wherein the conversions are caused selectively in a manner, with respect to delivery of power to the load, to achieve greater conversion efficiency than if all of the power delivered to the load were constrained to flow through the additional conversion elements and at least some of the boost conversion elements.

46. The method of claim 45 wherein the conversions are caused selectively to achieve a greater input voltage operating range for the apparatus than if all of the power delivered to the load were constrained to flow only through the additional conversion elements.

47. The method of claim 44 wherein the additional conversion is caused to occur in two converters.

48. The method of claim 47 further comprising selectively connecting the inputs of the two converters in parallel or series.

49. The method of claim 47 further comprising selectively connecting the outputs of the two converters in parallel or series.

50. Apparatus for converting power from a voltage source having a predetermined source voltage range, and delivering it to a load comprising two sets of power conversion elements, each set for effecting conversion of power from the voltage source, at least one of the sets having an input operating voltage range narrower than the source voltage range, and control circuitry for configuring and reconfiguring interconnections of the two sets with the voltage source and the load to provide an input operating voltage range for said apparatus which is greater than the input operating range of the set of power conversion elements having the narrower input operating voltage range.

51. The apparatus of claim 50 wherein the two sets operate in a power sharing arrangement.

52. The apparatus of claim 50 wherein the control circuitry connects the outputs of the two sets either in series or in parallel.

53. The apparatus of claim 50 wherein the control circuitry connects the outputs of the two sets in series when the voltage at the input of the two sets crosses a threshold.

54. The apparatus of claim 50 wherein the control circuitry connects the outputs of the two sets in parallel when the voltage at the input of the two sets crosses a threshold.

55. The apparatus of claim 53 or 54 wherein the threshold is related to the minimum input operating voltage of either of the sets.

56. The apparatus of claim 50 wherein the sets share essentially equally in the power delivered to the load.

57. The apparatus of claim 50 wherein the two sets comprise ZCS converters.

58. A method for enhancing the input voltage operating range of a power conversion circuit which has two sets of power conversion elements arranged to share power delivered to a load, comprising configuring the circuit with the two sets selectively in series or in parallel so that the input voltage operating range of the power conversion circuit is broader than the input voltage operating range of either of the sets of power conversion elements.

59. The method of claim 58 wherein the two sets are configured in series by configuring their inputs in series.

60. The method of claim 58 wherein the two sets are configured in series by configuring their outputs in series.

61. The method of claim 58 wherein the two sets are configured in parallel by configuring their inputs in parallel.

62. The method of claim 58 wherein the two sets are configured in parallel by configuring their outputs in parallel.

63. An apparatus for converting power from a voltage source having a predetermined source voltage range, and delivering it to a load comprising two sets of power conversion elements arranged to share power delivered to a load, each set having an input voltage operating range, circuitry for selectively configuring the power conversion elements in series or in parallel so that an input voltage range of the configuration is greater than the input voltage operating range of either set of power conversion elements.

64. The apparatus of claim 63 wherein configuring the power conversion elements in series comprises connecting their inputs in series.

65. The apparatus of claim 63 wherein configuring the power conversion elements in series comprises connecting their inputs in parallel.

66. The apparatus of claim 63 wherein configuring the power conversion elements in parallel comprises connecting their inputs in parallel.

67. The apparatus of claim 63 wherein configuring the power conversion elements in parallel comprises connecting their outputs in parallel.

* * * * *